United States Patent
Reshef et al.

(10) Patent No.: US 6,865,593 B1
(45) Date of Patent: Mar. 8, 2005

(54) DYNAMIC INTEGRATION OF WEB SITES

(75) Inventors: Eilon Reshef, Tel Aviv (IL); Gil Tayar, Givataim (IL)

(73) Assignee: WebCollege, Inc., New York, NY (US)

( * ) Notice: Subject to any disclaimer, the term of this patent is extended or adjusted under 35 U.S.C. 154(b) by 623 days.

(21) Appl. No.: 09/592,975

(22) Filed: Jun. 12, 2000

Related U.S. Application Data

(60) Provisional application No. 60/196,863, filed on Apr. 12, 2000.

(51) Int. Cl.$^7$ ............................................. G06F 15/16
(52) U.S. Cl. .................. 709/203; 345/787; 379/221.09; 707/3; 707/102; 709/217; 709/238; 709/246; 715/501.1; 717/109; 717/115
(58) Field of Search ................................ 709/200, 201, 709/203, 246

(56) References Cited

U.S. PATENT DOCUMENTS

| | | | |
|---|---|---|---|
| 5,757,900 A | * | 5/1998 | Nagel et al. |
| 5,881,230 A | * | 3/1999 | Christensen et al. |
| 5,918,010 A | | 6/1999 | Appleman et al. ..... 395/200.33 |
| 5,918,013 A | | 6/1999 | Mighdoll et al. ...... 395/200.47 |
| 5,959,630 A | | 9/1999 | Takeuchi et al. ............ 345/348 |
| 6,021,416 A | | 2/2000 | Dauerer et al. ............. 707/501 |
| 6,031,989 A | | 2/2000 | Cordell ....................... 395/701 |
| 6,101,510 A | * | 8/2000 | Stone et al. |
| 6,144,990 A | * | 11/2000 | Brandt et al. |
| 6,178,426 B1 | * | 1/2001 | Klein et al. ................. 707/102 |
| 6,189,137 B1 | * | 2/2001 | Hoffman |
| 6,223,178 B1 | * | 4/2001 | Himmel et al. |
| 6,339,438 B1 | * | 1/2002 | Bates et al. |
| 6,360,215 B1 | * | 3/2002 | Judd et al. ...................... 707/3 |
| 6,567,857 B1 | * | 5/2003 | Gupta et al. ................ 709/238 |

OTHER PUBLICATIONS

"Barnes and Noble Magazine Store", www.barnesandnoble.enews.com (web address), pp. 1–2, 1997.
Nielsen, J. "Why Frames Suck (Most of the Time)", www.useit.com/alertbox (web address), pp. 1–4, Dec. 1996.

* cited by examiner

Primary Examiner—Bharat Barot
Assistant Examiner—Michael Won
(74) Attorney, Agent, or Firm—Testa Hurwitz & Thibeault, LLP

(57) ABSTRACT

A method for displaying information includes identifying computer-readable service code at a service site, which code, when read by a client computer via a network, causes the computer to display at least one service page containing service information. At least a portion of the service-code is selected for inclusion in a service component containing at least a portion of the service information that corresponds to the selected code. A pointer is generated, indicating a location at which the service component is accessible, for inclusion of the pointer in host code accessible to the client computer from a host site, which is separate from the service site and is accessible via the network, the host code, when read by the client computer, causing the computer to display a host page containing host information. An invocation of the pointer by the client computer is received at the location when the client computer accesses the host page. The selected service code is then conveyed to the client computer, such that responsive to the selected service code, the client computer displays the service component on the host page.

61 Claims, 13 Drawing Sheets

FIG. 2B

DYNAMIC INTEGRATION OF WEB SITES

CROSS-REFERENCE TO RELATED APPLICATION

This application claims the benefit of U.S. provisional patent application No. 60/196,863, filed Apr. 12, 2000, which is incorporated herein by reference.

FIELD OF THE INVENTION

The present invention relates generally to methods and systems for transmission of content over networks, and specifically to methods for combining content and business processes from multiple suppliers for display on World Wide Web sites.

BACKGROUND OF THE INVENTION

Web site operators have come to realize that creating partnerships with other, complementary Web sites can help to increase marketing reach, create brand recognition and build sales. These partnerships enable a service site, having products or services to sell and wishing to reach larger numbers of potential customers, to establish a "presence" on other, host sites.

The most common partnership model at present is based on placing a banner or other descriptor on the host site, with a hyperlink to the service site. This model is simple and easily scalable to include large numbers of affiliated host sites. It typically generates only a low rate of response, however, and gives the service provider no real presence on the host site. On the other side, it does not give the host any way of participating in or monitoring the activities of the service site. In fact, as soon as a user clicks on the link to the service site, that user is carried away from the host site, and may not return.

Other models have been developed attempting to provide closer integration between the service and host sites. For example, some Web development tools allow the host site to define a window, or frame, on a host Web page. A Web page from the service site can then be displayed in the frame, in this case without carrying the user away from the host site. Framing the service site's Web page in this manner, however, uses up substantial "real estate" on the host Web page and creates an inconsistent look. Users generally find these frames unappealing and difficult to navigate in. The frame remains a separate entity, in effect a browser within a browser, disconnected from the context of the host Web site. Aspects of frames and their disadvantages are described by Nielsen in an article entitled "Why Frames Suck (Most of the Time)", available at http://www.useit.com/alertbox/9612.html; which is incorporated herein by reference.

As an alternative to framing, some large service sites offer their own Web page templates, and attempt to induce host sites to build their Web pages into the templates. See, for example, the "barnesandnoble.com Magazine Store" operated by eNews.com, at http://barnesandnoble.enews.com. This type of template-based "co-branding" requires a dedicated development effort for each host site, making the template approach difficult to scale and to maintain. At best, the template provides a "page within a page," with no real integration of the functionalities of the host and service sites. Functional collaboration between the host and service sites can only be achieved by back-end integration, wherein the two sites jointly develop a shared application. The infrastructure needed for collaborations of this last sort, however, can be created only one by one, with high development costs, long time-to-market and complex maintenance requirements.

SUMMARY OF THE INVENTION

It is an object of some aspects of the present invention to provide improved methods, apparatus and software for partnering between Web sites.

It is a further object of some aspects of the present invention to provide tools for syndicating content from a service Web site among multiple host Web sites in a manner that is easy to scale and to maintain. It is likewise an object of such aspects of the present invention to enable a business process originating on the service site to be integrated into the host sites.

In preferred embodiments of the present invention, an operator of a service Web site selects and prepares one or more elements of the site for inclusion as a component in a Web page of a host Web site. Substantially any elements of the service site may be included in the component, including content and/or processes that run on the service site. The component is prepared by marking selected portions of one or more pages of browser-readable code belonging to the service site, such as a Web page written in Hypertext Mark-up Language (HTML), with tags indicating the elements of the page that are to be included in the component.

Preferably, the tags used for this purpose comprise code written in Extensible Mark-up Language (XML), which are added to the code of the Web page in appropriate locations. Most preferably, the XML tags also define aspects of the Web page component, such as color and fonts, that can be customized by the host site operator. Additionally or alternatively, the tags define methods that can be used by the host site operator to integrate the component into the work flow of the host site, by extracting information from the component, for example. Further alternatively, either complete pages or selected portions thereof for inclusion in the component are defined by an indication external to the pages themselves, in an XML file or a database, for example.

To display the component from the service site on a host Web page, the host site operator inserts a line of code invoking the component, preferably in the form of HTML or XML code, into the Web page at a desired location. An identification of the host site, preferably together with a customized "skin" of the component assigned by the host site, are stored by a site integration server, which is coupled to the service site's Web server. When a user's Web browser accesses the host Web page, the browser reads the line of code referring to the component and is directed by the code to the site integration server. This server accesses the appropriate service site Web page, using the XML tags mentioned above to cull from the page only the elements that are to be included in the component. The site integration server adjusts the appearance of the component based on the customized skin of the host site, and delivers the component to the user's browser. The browser displays the component in the location assigned by the host site operator, so that the component looks and "feels" to the user like an integral part of the host Web site.

In some preferred embodiments of the present invention, the service site component comprises multiple pages, typically corresponding to multiple Web pages available to visitors to the service site, with links between the pages. The links are preserved, as well, among the component pages. When the user viewing the component at the host site clicks on one of the links, the appropriate next component page is invoked and appears on the user's browser. The new component page is preferably displayed on the same host page as before, or on another, predetermined page of the host site.

The present invention thus provides more effective integration of multiple Web sites than can be achieved using methods known in the art. For the host site operator, it becomes possible to integrate content and applications from the service site with minimal development effort and without compromising the desired look and workflow of the host site. Users accessing the service site content on a host Web page remain in the host site throughout their interaction with the application, rather than being "linked away." The service site operator benefits from the ease with which the Web page component can be defined, controlled and updated, using standard mark-up language tools, and from the possibility of scaling to wide distribution of the component without added development effort. As a result, the browsing experience of users visiting host Web pages is enriched, and both the host and service sites can benefit from increased user exposure and revenues.

Preferably, the site integration server is physically located at the service site and operates in conjunction with Web servers at that site. Alternatively, the site integration server may be physically located at substantially any site that is linked to the Web. In one embodiment, rather than accessing the host site directly, the user's browser accesses the site integration server This server reads the appropriate host page from the host site, and reads the service page from the service site, and then delivers the entire integrated host page, with the service site component, to the browser.

In describing preferred embodiments of the present invention and in the claims, the term "service site" is used to refer to a Web site from which content and/or a business process is taken for integration into Web pages of other sites, and "host site" refers to the sites into whose pages the component is integrated. It should be understood, however, that these terms are used arbitrarily, for convenience and clarity of description, and substantially any Web site may function as either a service site or as a host site, or even as both a service site and a host site simultaneously. Furthermore, although preferred embodiments described herein are based on certain programming languages and tools that are commonly used in current World Wide Web applications, it will be apparent to those skilled in the art that the principles of the present invention may similarly be implemented using other languages and tools, and in other network information access applications.

There is therefore provided, in accordance with a preferred embodiment of the present invention, a method for displaying information, including:

identifying computer-readable service code at a service site, which code, when read by a client computer via a network, causes the computer to display at least one service page containing service information;

selecting at least a portion of the service code for inclusion in a service component containing at least a portion of the service information that corresponds to the selected code;

generating a pointer indicating a location at which the service component is accessible, for inclusion of the pointer in host code accessible to the client computer from a host site, which is separate from the service site and is accessible via the network, the host code, when read by the client computer, causing the computer to display a host page containing host information; receiving at the location an invocation of the pointer by the client computer when the client computer accesses the host page; and conveying the selected service code to the client computer, such that responsive to the selected service code, the client computer displays the service component on the host page.

Preferably, the network includes the Internet, and the service site and host site include World Wide Web all sites.

Further preferably, the host code and service code include code written in a mark-up language, most preferably Hypertext Mark-up Language (HTML), which is read by a browser program running on the client computer. Preferably, selecting the service code includes adding textual tags to the mark-up language code, most preferably Extensible Mark-up Language (XML) tags, including an XML tag defining an attribute of the component that can be altered when the component is displayed on the host page.

Additionally or alternatively, selecting the service code includes defining one or more pages of the service code for inclusion in the component by means of an indication external to the one or more pages. Preferably, the indication includes an Extensible Mark-up Language (XML) file. Alternatively, the indication is given in a database. Further alternatively or additionally, defining the one or more pages includes defining first and second pages for inclusion in the component, wherein the second page is defined by a link on the first page.

Additionally or alternatively, conveying the selected service code to the client computer includes conveying a script command instructing the client computer to insert the service component in the host page. Preferably, conveying the script command includes conveying a JavaScript document-.write command having the selected service code as an argument. Most preferably, the selected service code includes instructions in a scripting language for execution by the client computer.

Preferably, the pointer includes a uniform resource locator (URL). In a preferred embodiment, the service component has a state, and receiving the invocation of the pointer includes receiving a hypertext transfer protocol (HTTP) request specifying the URL and the state of the component. Preferably, specifying the state of the component includes inserting information regarding the state in a query portion of the URL. Additionally or alternatively, the URL is inserted in textual tag, most preferably a script tag, that is included in the host code.

Preferably, selecting the service code includes associating with the code an indication of one or more properties of the component that can be altered when the component is displayed on the host page. In a preferred embodiment, the method includes defining a skin that specifies a value to be assigned to at least one of the properties when the service component is displayed on the host page. Preferably, generating the pointer includes passing the pointer to multiple host sites for inclusion in the host code of each of the sites, and defining the skin includes defining a respective skin for each of the host sites. Additionally or alternatively, conveying the selected service code includes modifying the at least one of the properties in the code conveyed to the client computer responsive to the skin.

Preferably, adding the indication of the one or more properties includes specifying one or more visual properties that can be customized by an operator of the host site.

In a preferred embodiment, generating the pointer includes passing the pointer to first and second host sites for inclusion in the host code of each of the sites, wherein a first value is applied to at least one of the properties when the component is displayed on the host page of the first host site, and a second value, different from the first value, is applied to the at least one of the properties when the component is displayed on the host page of the second host site. Preferably, receiving the invocation of the pointer includes receiving an indication of whether the client computer received the pointer from the first or the second site, and conveying the selected service code to the client computer includes modifying the at least one of the properties in the selected service code conveyed to the client computer responsive to the indication.

In another preferred embodiment, selecting the service code includes adding to the code a method for extracting data from the service component for use by the host site. Preferably, the extracted data relates to a service provided by the service site to a user of the client computer in return for payment.

Preferably, generating the pointer includes passing the pointer to multiple host sites for inclusion in the host code of each of the sites. In a preferred embodiment, the multiple host sites include first and second host sites, and receiving the invocation of the pointer includes receiving an indication of whether the client computer received the pointer from the first or the second site, wherein conveying the selected service code to the client computer includes modifying the information conveyed to the client computer responsive to the indication. Preferably, the service component has a state, and the information conveyed to the client computer includes instance data indicative of the state of the component, wherein modifying the information includes modifying the instance data conveyed to the client computer dependent upon whether the client computer received the pointer from the first or the second site. Most preferably, the service site provides a service to a user of the client computer who interacts with the service site via the network, typically a service in return for payment, and conveying the selected service code to the client computer includes enabling the user to procure the service while viewing the host page of any of the multiple host sites on the client computer.

Additionally or alternatively, identifying the service code includes identifying code corresponding to multiple service pages to be included in the service component, including first and second service pages, wherein selecting the service code includes selecting first and second portions of the code corresponding respectively to the first and second service pages, the first selected portion including a link from the first page to the second page, and the method includes receiving an invocation of the link by the client computer while the first page of the service component is displayed on one of the host pages, and conveying the second selected portion to the client computer responsive to the link.

Preferably, the host page is one of a plurality of host pages at the host site, and conveying the second selected portion includes conveying the second selected portion such that responsive thereto, the client computer displays the second service page on one of the host pages. Most preferably, the client computer displays each of the first and second pages of the service component in a predefined location on one of the host pages.

In a preferred embodiment, the method includes specifying one of the host pages to be associated respectively with each of the service pages, such that when one of the service pages is displayed in the service component, it is displayed on the one of the host pages that is associated therewith. Preferably, specifying the one of the host pages includes associating the first and second service pages respectively with first and second ones of the host pages, and conveying the second selected portion includes, responsive to the invocation of the link, calling for the second one of the host pages to be displayed on the client computer. Further preferably, calling for the second one of the host pages to be displayed includes redirecting the client computer to access the second one of the host pages at the host site. Alternatively, the method includes modifying the link from the first service page to the second service page so that it links directly to the second one of the host pages.

Additionally or alternatively, generating the pointer includes passing first and second pointers to the host site indicating respective locations of the first and second selected portions at the service site, for inclusion of the first and second pointers in the host code of the first and second ones of the host pages, respectively, such that responsive to accessing the second one of the host pages, the client computer invokes the second pointer.

In another preferred embodiment, identifying the code corresponding to the multiple service pages includes associating the multiple service pages with respective faces, an specifying the one of the host pages to be associated respectively with each of the service pages includes recording, for each of the faces, a corresponding host page. Preferably, associating the service pages with the respective faces includes associating at least two of the pages with the same one of the faces.

Preferably, the first and second service pages are associated with a process running on the service site, the process having a state, and conveying the second selected portion includes conveying instance data indicative of the state of the process. In a preferred embodiment, the process is associated with a transaction between the service site and a user of the client computer who interacts with the service site via the network, and conveying the second selected portion includes consummating the transaction.

Preferably, generating the pointer to the location at which the service component is accessible includes generating a pointer to the service site. Alternatively, generating the pointer to the location at which the service component is accessible includes generating a pointer to a location remote from the service site.

Further preferably, the host code is conveyed from the host site to the client computer substantially without passing through the location at which the service component is accessible. Alternatively, the method includes receiving the host code at the location at which the service component is accessible, and conveying the selected service code includes conveying both the host code and the selected service code from the location to the client computer.

There is also provided, in accordance with a preferred embodiment of the present invention, a method of electronic commerce, including:

identifying computer-readable service code at a service site offering a service, which code, when read by a client computer via a network, causes the computer to display at least one service component enabling a user of the client computer to procure the service;

generating a pointer indicating a location at which the service component is accessible, for inclusion of the pointer in respective host code accessible to the client computer from each of a plurality of host sites, which are separate from the service site and are accessible via the network, the host code, when read by the client computer, causing the computer to display a respective host page of each of the sites;

receiving an invocation of the pointer by the client computer when the client computer accesses the respective host page of any one of the sites;

conveying the service code to the client computer, such that responsive to the service code, the client computer displays the service component on the respective host page; and providing the service to the user of the client computer while the client computer displays the respective host page.

There is additionally provided, in accordance with a preferred embodiment of the present invention, a method for displaying information, including:

providing computer-readable host code at a host site, which code, when read by a client computer via a network, causes the computer to display at least one host page containing host information;

inserting in the code of the host page a pointer indicating a location at which a service component is accessible, the service component including selected code available at a service site, which is separate from the host site and is accessible via the network, the selected code including at least a portion of service code available at the service site, which service code, when read by a client computer accessing the service site via the network independently of the host site, causes the computer to display at least one service page containing service information, at least a portion of which, corresponding to the selected code, is included in the service component;

specifying in the host code a location on the at least one host page for display of the service component; and passing host code including the pointer to the client computer when the client computer accesses the host page, such that responsive to the pointer, the client computer requests the selected code, and upon receiving the selected code, the client computer displays the service component in the specified location on the host page.

There is further provided, in accordance with a preferred embodiment of the present invention, a component server, including computer apparatus that is adapted to receive an identification of computer-readable service code at a service site, which code, when read by a client computer via a network, causes the computer to display at least one service page containing service information, wherein at least a portion of the service code is selected for inclusion in a service component containing at least a portion of the service information that corresponds to the selected code, and wherein a pointer is generated indicating a location at which the service component is accessible, for inclusion of the pointer in host code accessible to the client computer from a host site, which is separate from the service site and is accessible via the network, the host code, when read by the client computer, causing the computer to display a host page containing host information, which apparatus is further adapted to receive via the network an invocation of the pointer by the client computer when the client computer accesses the host page, and to convey data including the selected service code to the client computer over the network, such that responsive to the selected service code, the client computer displays the service component on the host page.

Preferably, the network includes the Internet, and the server includes a World Wide Web server.

Preferably, the selected service code includes an indication of one or more properties of the component that can be altered when the component is displayed on the host page, and the apparatus is adapted to alter the data conveyed to the client computer responsive to the properties. In a preferred embodiment, the server includes a memory, which is adapted to store a skin, which specifies a value to be assigned to at least one of the properties when the service component is displayed on the host page, and the apparatus is adapted to alter the data in accordance with a skin stored by the server.

The apparatus may be adapted to operate at the service site or, alternatively, remotely from the service site.

There is moreover provided, in accordance with a preferred embodiment of the present invention, an electronic commerce server, including computer apparatus that is adapted to receive an identification of computer-readable service code at a service site offering a service, which code, when read by a client computer via a network, causes the computer to display at least one service component enabling a user of the client computer to procure the service, wherein a pointer is generated to indicate a location at which the service component is accessible, for inclusion of the pointer in respective host code accessible to the client computer at each of a plurality of host sites, which are separate from the service site and are accessible via the network, the host code, when read by the client computer, causing the computer to display a respective host page of each of the sites, which apparatus is further adapted to receive an invocation of the pointer by the client computer when the client computer accesses the respective host page of any one of the sites, and to convey data including the service code to the client computer, such that responsive to the service code, the client computer displays the service component on the respective host page, so that the service is provided to the user of the client computer while the client computer displays the respective host page.

There is furthermore provided, in accordance with a preferred embodiment of the present invention, a host server, for use at a host site, including computer apparatus adapted to store computer-readable host code, which code, when read by a client computer via a network, causes the computer to display at least one host page containing host information, wherein a pointer is inserted in the code of the host page a pointer indicating a location at which a service component is accessible, the service component including selected code available at a service site, which is separate from the host site and is accessible via the network, the selected code including at least a portion of service code available at the service site, which service code, when read by a client computer accessing the service site via the network independently of the host site, causes the computer to display at least one service page containing service information, a portion of which, corresponding to the selected code, is included in the service component, and wherein the host code includes a specification of a location on the at least one host page for display of the service component, which apparatus is further adapted to convey the host code, including the pointer, to the client computer when the client computer accesses the host page, such that responsive to the pointer, the client computer requests the selected code, and upon receiving the selected code, the client computer displays the service component in the specified location on the host page.

There is additionally provided, in accordance with a preferred embodiment of the present invention, a computer software product, including a computer-readable medium in which program instructions are stored, which instructions, when read by a computer server, cause the server to receive an identification of computer-readable service code at a service site, which code, when read by a client computer via a network, causes the computer to display at least one service page containing service information, wherein at least a portion of the service code is selected for inclusion in a service component containing at least a portion of the service information that corresponds to the selected code, and wherein a pointer is generated indicating a location at which the service component is accessible, for inclusion of the pointer in host code accessible to the client computer at a host site, which is separate from the service site and is accessible via the network, the host code, when read by the client computer, causing the client computer to display a host page containing host information, and wherein the instructions further cause the server to receive an invocation of the pointer by the client computer when the client computer accesses the host page, and to convey data including the selected service code to the client computer, such that responsive to the selected service code, the client computer displays the service component on the host page.

There is also provided, in accordance with a preferred embodiment of the present invention, a computer software product, including a computer-readable medium in which program instructions are stored, which instructions, when read by a computer server, cause the server to receive an identification of computer-readable service code at a service site offering a service, which code, when read by a client computer via a network, causes the client computer to display at least one service component enabling a user of the client computer to procure the service, wherein a pointer is generated indicating a location at which the service component is accessible, for inclusion of the pointer in respective host code accessible to the client computer at each of a plurality of host sites, which are separate from the service site and are accessible via the network, the host code, when read by the client computer, causing the client computer to display a respective host page of each of the sites, which instructions further cause the server to receive an invocation of the pointer by the client computer when the client computer accesses the respective host page of any one of the sites, and to convey data including the service code to the client computer, such that responsive to the service code, the client computer displays the service component on the respective host page, so that the service is provided to the user of the client computer while the client computer displays the respective host page.

There is moreover provided, in accordance with a preferred embodiment of the present invention, a computer software product, including a computer-readable medium in which program instructions are stored, which instructions, when read by a computer server at a host site, cause the server to store computer-readable host code, which code, when read by a client computer via a network, causes the client computer to display at least one host page containing host information, wherein a pointer is inserted in the code of the host page a pointer indicating a location at which a service component is accessible, the service component including selected code available at a service site, which is separate from the host site and is accessible via the network, the selected code including at least a portion of service code available at the service site, which service code, when read by a client computer accessing the service site via the network independently of the host site, causes the computer to display at least one service page containing service information, at least a portion of which, corresponding to the selected code, is included in the service component, and wherein the host code includes a specification of a location on the at least one host page for display of the service component, which instructions further cause the server to convey the host code, including the pointer, to the client computer when the client computer accesses the host page, such that responsive to the pointer, the client computer requests the selected code, and upon receiving the selected code, the client computer displays the service component in the specified location on the host page.

The present invention will be more fully understood from the following detailed description of the preferred embodiments thereof, taken together with the drawings in which:

BRIEF DESCRIPTION OF THE DRAWINGS

FIGS. 2A and 2B are schematic representations of service site Web pages, used in a preferred embodiment of the present invention;

DETAILED DESCRIPTION OF PREFERRED EMBODIMENTS SYSTEM OVERVIEW

Figure 1:
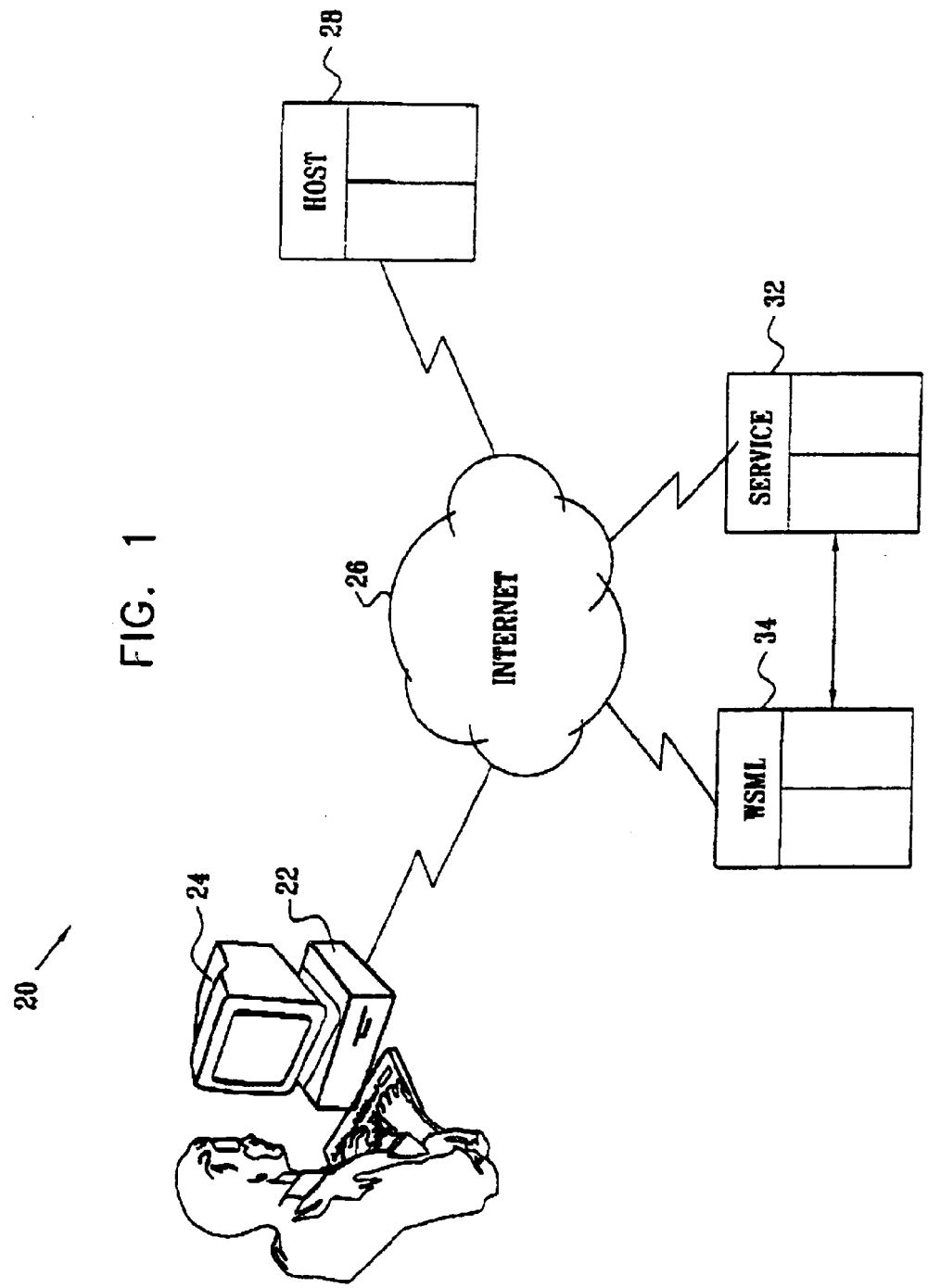
FIG. 1 is a schematic, pictorial illustration of a system for Web site integration, in accordance with a preferred embodiment of the present invention.

FIG. 1 is a schematic, pictorial illustration of a system 20 for dynamic Web site integration, in accordance with a preferred embodiment of the present invention. The system is intended to provide content to a client computer 22, used to browse Web sites via a network 26, typically the Internet.

A browser program on computer 22, as is known in the art, reads content from the Web sites. The content is typically in the form of textual code in a mark-up language, such as HTML. The computer generates a graphic display of the content on a screen 24.

In the example shown in FIG. 1, computer 22 accesses a host site 28, comprising a Web server, as is known in the art, serving content determined by an operator of the host site. A service site 32, which similarly comprises a Web server, also serves content to users of network 26. In addition, an operator of the service site offers selected elements of the service site content as a dynamic Web page component, for integration into Web pages of other sites, such as host site 28. Integration of the component in other Web pages is achieved by means of a Web Service Mark-up Language (WSML) server 34, whose operation is explained in detail hereinbelow. WSML is a mark-up language developed by the present inventors, based on XML, as described further hereinbelow.

WSML server 34 itself comprises a Web server, such as a Sun Solaris™ server or a Microsoft Windows NT™ Internet Information Server (IIS). Although for clarity of illustration, WSML server 34 is shown as a separate entity from the Web server of service site 32, the two servers may, in fact, run on the same machine or may be connected by a local-area network (LAN). In order to carry out the functions of the WSML server, a software package, typically including a number of software modules, is installed on the Web server. These modules may be downloaded to the server machine over network 26, or they may alternatively be provided on tangible media, such as CD-ROM or non-volatile memory.

Figure 2A:
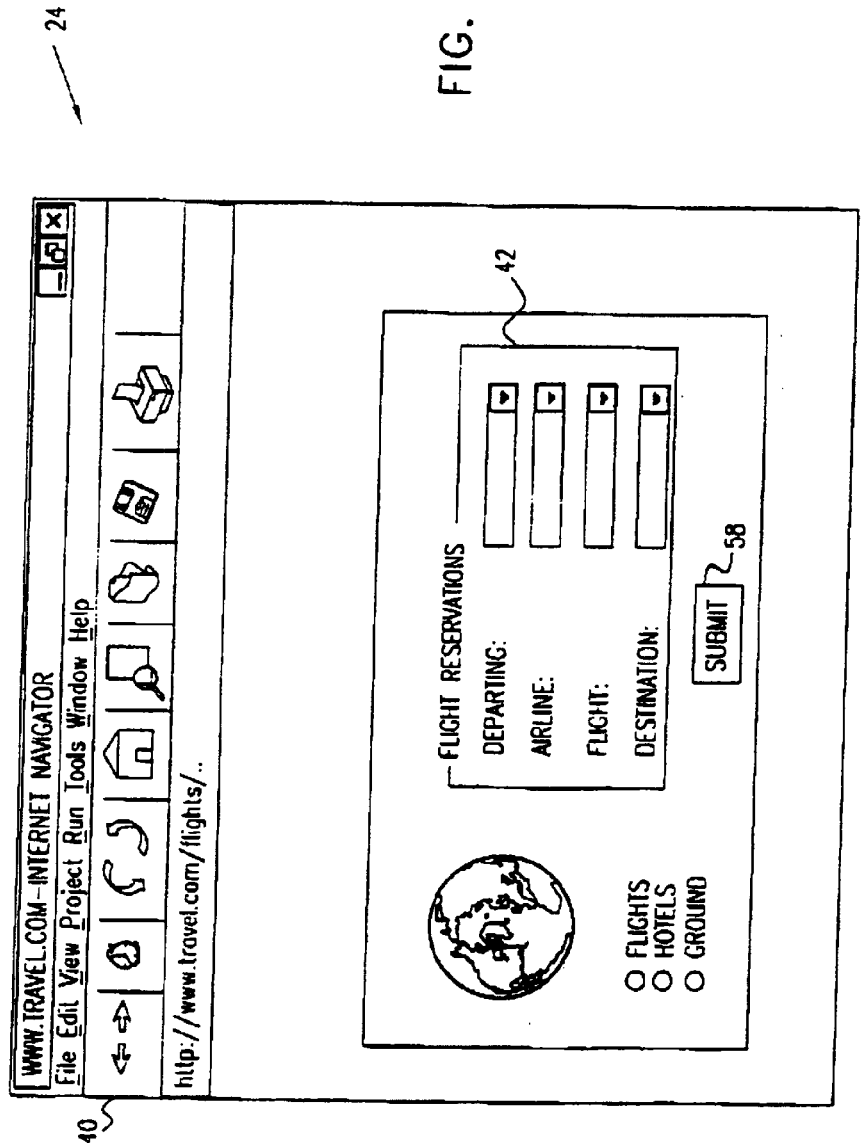
Figure 2B:
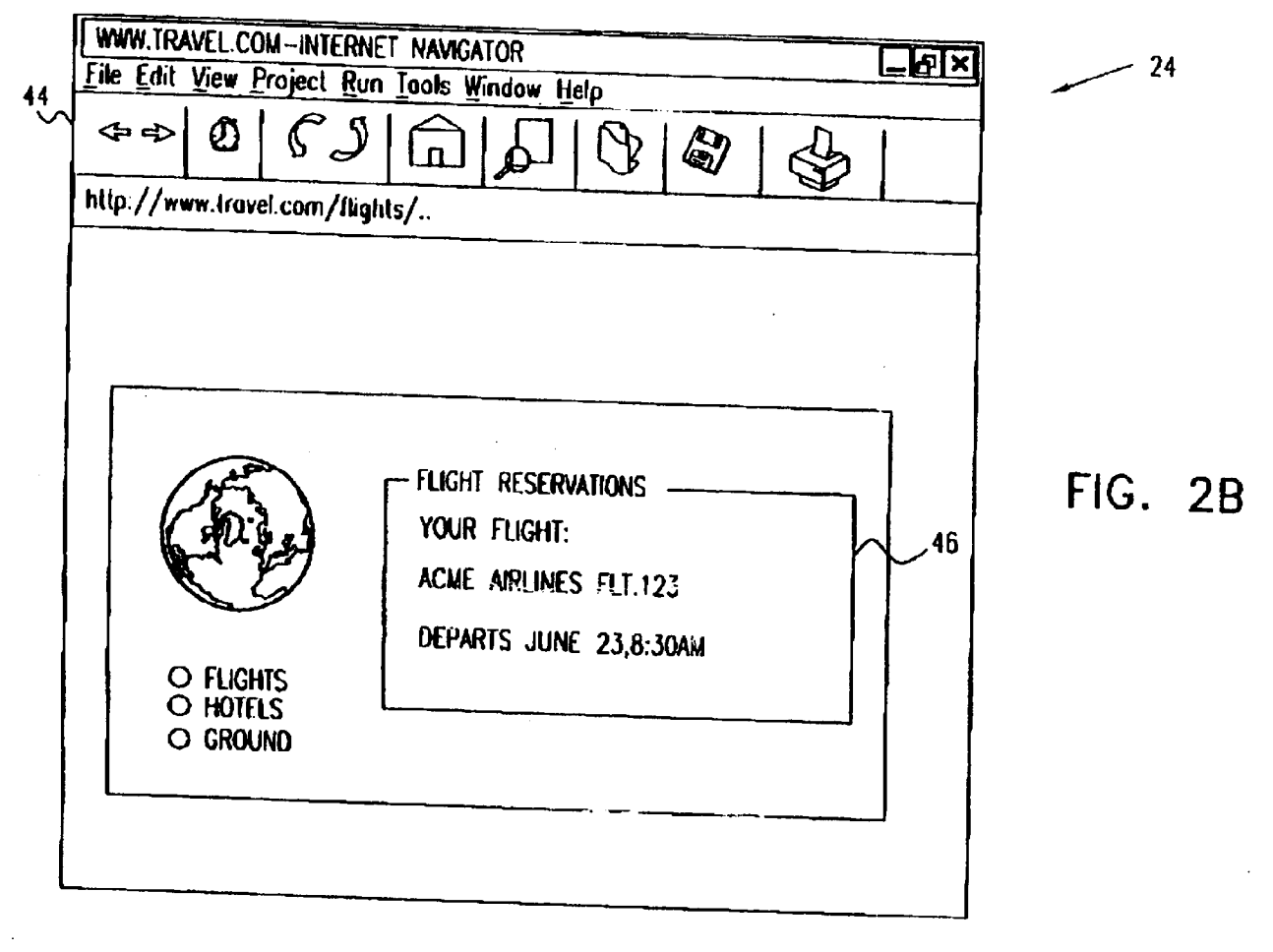

FIGS. 2A and 2B are schematic representations of Web pages 40 and 44, respectively, on service site 32, used in implementing a preferred embodiment of the present invention. In this example, service site 32 is a travel service provider. An interactive reservation request box 42 on page 40 enables users to request flight information and make flight reservations. The user's flight reservations are then displayed in a reservation results box 46 on page 44.

Figure 3A:
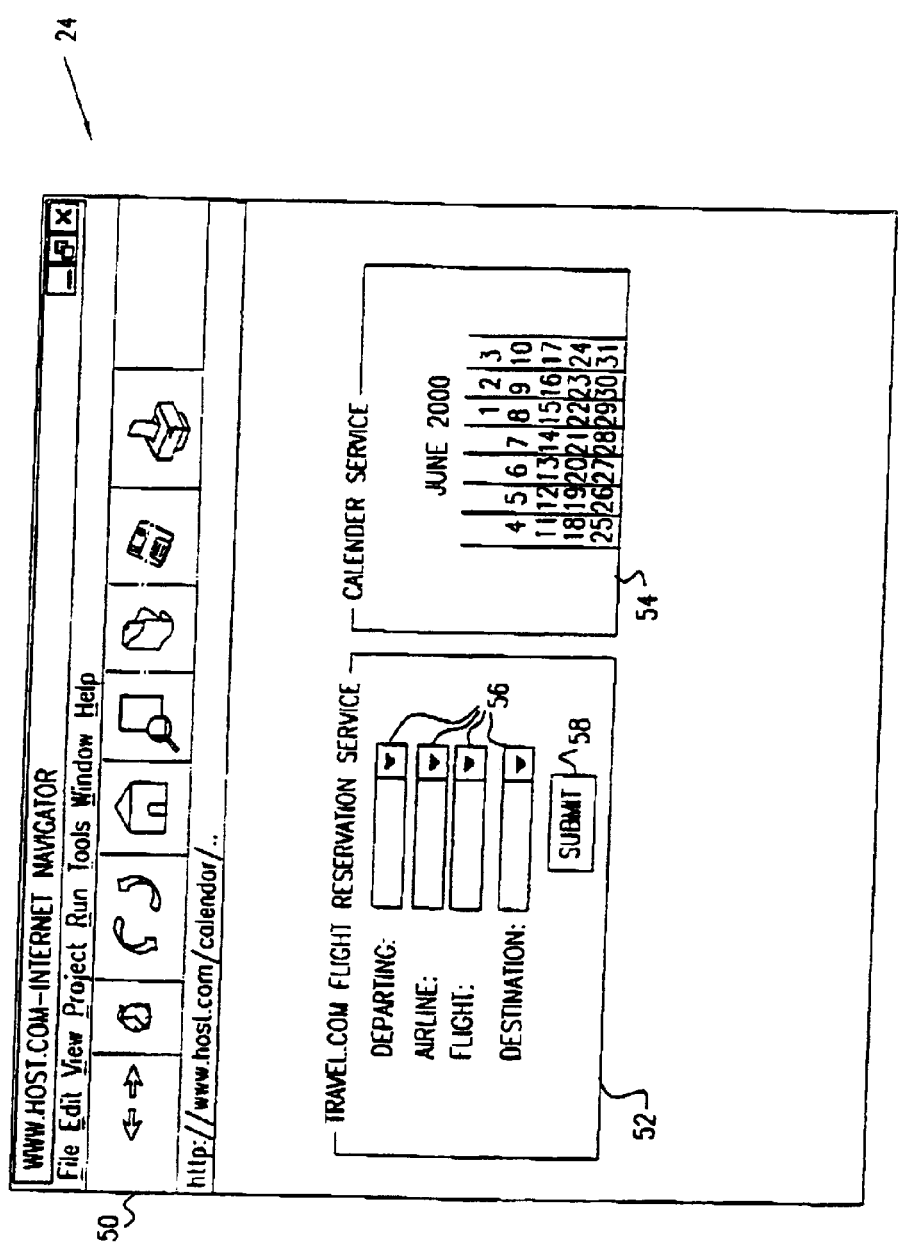
FIGS. 3A and 3B are schematic representations of host site Web pages incorporating a service component, in accordance with a preferred embodiment of the present invention.
Figure 3B:
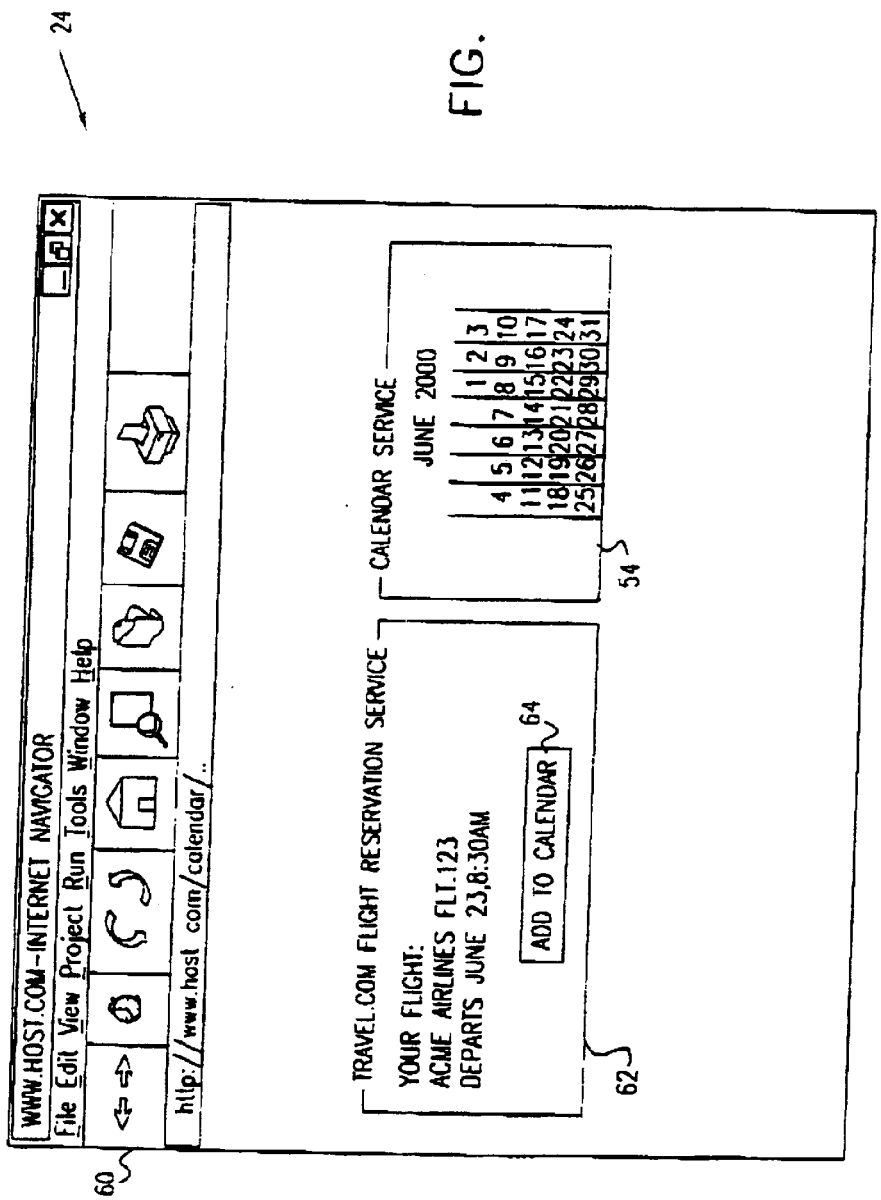

FIGS. 3A and 3B are schematic representations of Web pages 50 and 60, respectively, belonging to host site 28, in accordance with a preferred embodiment of the present invention. Host site 28 is in the business of providing information on events at different location and enables users to maintain a personal calendar 54 in which scheduled events are recorded. The operators of the host site and the service site have agreed to offer the flight reservation services provided by service site 32 on pages of the host site. This arrangement is preferably a part of a program of syndication of such services among multiple Web sites by the service site. Thus, the contents of request box 42 are displayed in a component window 52 on page 50 of host site 28. When the user has filled in information boxes 56 and clicked on a submit button 58, the request is conveyed by WSML server 34 to service site 32. Flight reservations that are made in this manner are then displayed in a second component window 62 on page 60 of the host site. The methods by which these functions are accomplished are described hereinbelow.

Figure 4:
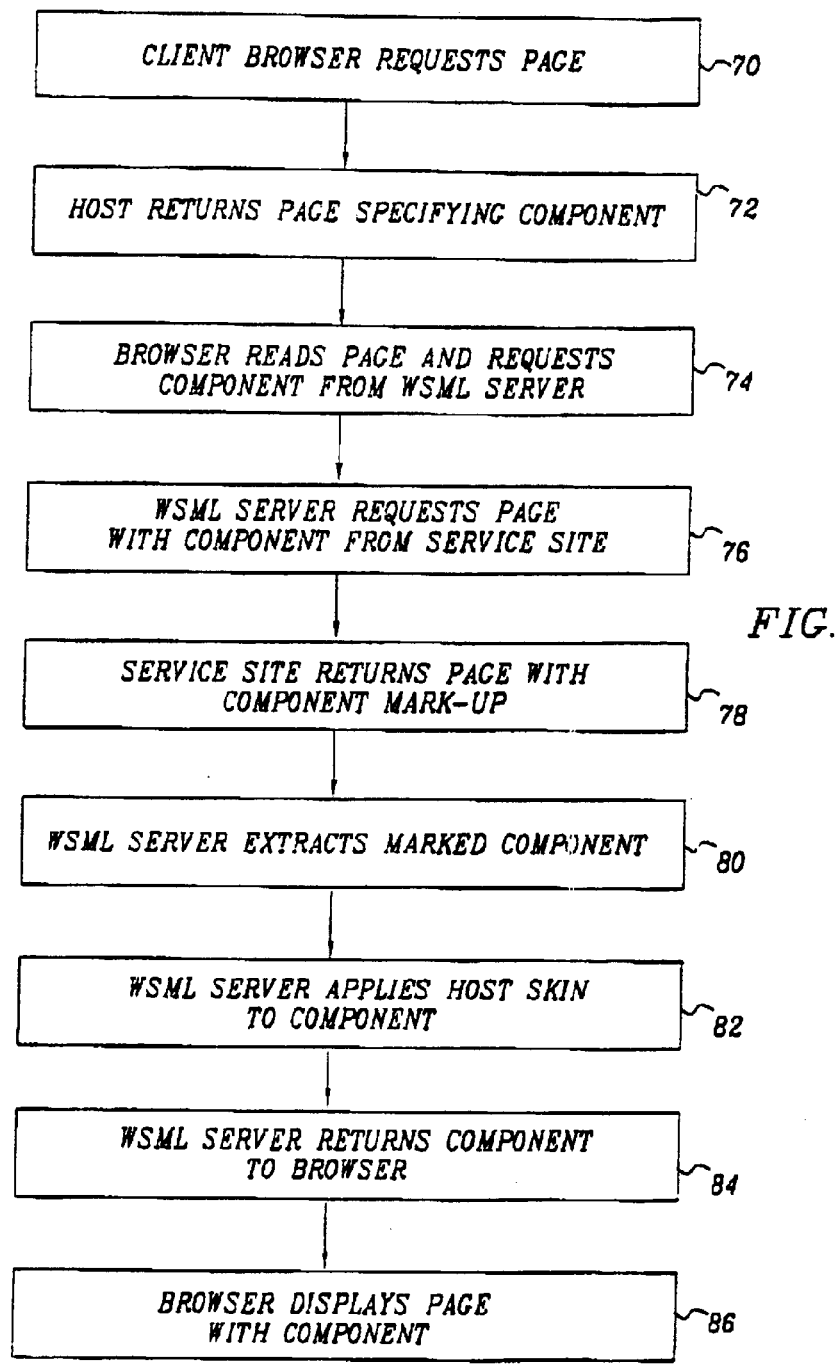
FIG. 4 is a flow chart that schematically illustrates a method for providing a Web page component to a browser running on a client computer, in accordance in with a preferred embodiment of the present invention.

FIG. 4 is a flow chart that schematically illustrates a method for generating and displaying Web page 50 with component window 52, as shown in FIG. 3A, in accordance with a preferred embodiment of the present invention. The method is described generally at this point to aid in conceptual understanding. Further implementation details are described below with reference to FIGS. 6 through 12.

At a host page request step 70, the browser running on computer 22 requests page 50 from host site 28, typically when a user of computer 22 clicks on an appropriate "travel" button on the host site home page. The server at site 28 returns the HTML code corresponding to page 50 to computer 22, at a host page return step 72, except that in place of the contents of window 52, the server sends a line of code with a uniform resource locator (URL) of WSML server 34. This URL preferably contains an identifier that is specific to the host site and to the service site from which the component in window 52 is to be taken. Upon reading this code, the browser sends a Hypertext Transfer Protocol (HTTP) request to server 34, as is known in the art, asking for the component specified by the URL, at a component request step 74.

Upon receiving the request, the WSML server determines that the component in question is taken from page 40 of service site 32 and requests the page from the service site Web server, at a service page request step 76. The HTML code for page 40 has already been marked up by the service site operator, preferably using XML tags, to identify box 42 for inclusion in page 50, as agreed by the site operators. The tags preferably also indicate attributes of box 42 that may be customized, at the request of the operator of host site 28, for inclusion in window 52, as well as methods that may be used by the host site operator to extract information from window 52. The customized attributes selected by the host site operator are stored by WSML server 34 as a "skin" for the component, preferably in a component information database (CDB) maintained by the server for this purpose. Methods and formats for use in marking up Web pages in this manner and for defining component skins are described in detail hereinbelow.

At a service page return step 78, the requested, marked up page is returned to WSML server 34. Based on the tags in the code of page 40, the WSML server extracts the elements of box 42 that are to be included in window 52, at a component extraction step 80. The WSML server also recalls the host-specific skin or the component. It uses the URL received at step 74 to determine the host site for which the component is requested and thus to choose the appropriate skin. At a skin application step 82, server 34 applies this skin to the component, so that the component receives the form of window 52 (FIG. 3A).

The WSML server returns the component to the browser of computer 22, at a component return step 84. Preferably, the component is returned in the form of a JavaScript document.write command having as its argument the portion of the code from page 40, corresponding to box 42, that is to be transposed into window 52. This portion of the code typically comprises HTML code, and may itself comprise executable instructions, such as JavaScript commands. In response to the document.write, the browser on computer 22 displays page 50 with the flight reservation request form of the service site displayed in window 52, at a component display step 86.

In the example of FIGS. 3A and 3B, the service site component includes interactive elements, such as text boxes 56, which the user is prompted to fill in with appropriate information for the flight reservation application running on service site 32. Once the information has been filled in, and the user clicks on "submit" button 58, the information is passed to the service site. If the user were interacting directly with the service site, using page 40, for example (FIG. 2A), the information would be processed, and page 44, with the processing results, would then be passed to computer 22. The processing results in this case are the flight reservations that the user has made, as shown in box 46 (FIG. 2B). Instead, in this preferred embodiment of the present invention, the processing results appear in component window 62 of page 60, belonging to host site 28.

Figure 5:
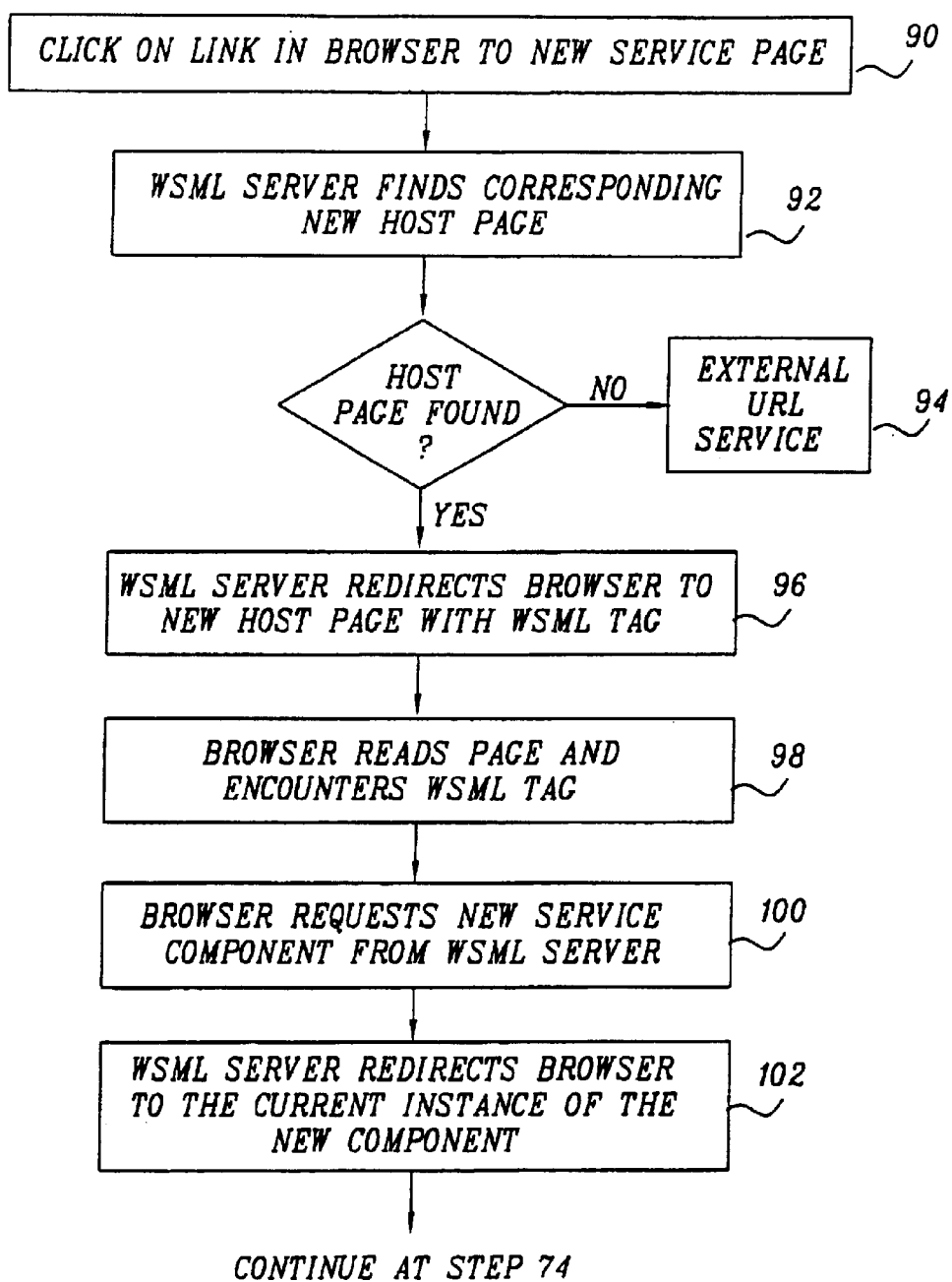
FIG. 5 is a flow chart that schematically illustrates a method for servicing a user request for a link appearing in the Web page component of FIG. 4, in accordance with a preferred embodiment of the present intention.

FIG. 5 is a flow chart that schematically illustrates a method for generating and displaying page 60, including window 62 showing the processing results, in accordance with a preferred embodiment of the present invention. At a link step 90, the user of computer 22 clicks on submit button 58. This button invokes a new URL, which is directed to WSML server 34 and calls for the service component shown in window 62 by means of a new HTTP request from computer 22. As noted above, this new service component corresponds to page 44 of service site 32 on which the processing results, i.e., the flight reservations, are displayed. The HTML code of page 44 is marked up to identify the new component, in substantially the same way as was page 40. The new component is to be displayed on a new host page, in this case page 60, as specified in advance by the operator of host site 28. The new host page may be identical to the preceding host page 50, or it may include other changes introduced by the host site operator. In any case, server 34 stores a URL of the new host page (page 60) as a part of the skin of the new component.

At a host page location step 92, WSML server 34 receives the HTTP request that originated from computer 22 at step 90. The server looks up the URL specified by the request in order to determine whether there is a host page associated with this service site page. If not, the WSML server preferably associates the new component from page 44 with the same page of the host site as was used for the previous component, i.e., with page 50. Alternatively, the link invoked at step 90 may take the user out of host site 28, to a Web page belonging exclusively to service site 32, in order to complete the transaction, at an external URL service step 94. This step is comparable to the action invoked by links from one Web site to another, as are currently known in the art.

Otherwise, assuming that WSML server 34 finds the identity of the host page (page 60) associated with the new service page (page 44), server 34 redirects the browser on computer 22 to the appropriate host page, at a host page redirection step 96. The redirection is preferably carried out using a standard HTTP redirect message, as is known in the art. Page 60 includes a HTML or XML tag identifying the contents of window 62 as being located on WSML server 34. At a host page reading step 98, the browser reads the 4TML code for page 60 from the server on host site 28 and encounters the tag corresponding to window 62. In response to the tag, the browser sends another HTTP request to server 34, at a new component request step 100, requesting the component that is to go in the window.

In order to send the correct component, WSML server 34 must track and save the state of the interaction of the user with the service given by Web site 32. In other words, even if host pages 50 and 60 are identical (except for the contents of respective windows 52 and 62) and have the same URL, the WSML server must ensure that the information in service windows 52 and 62 is properly updated at each stage of the interaction. It is also necessary to prevent the browser on computer 22 from reverting to a cached version of the service component, containing an earlier instance of the information provided to the user.

Therefore, URLs written by WSML server 34 preferably contain instance data, indicating the state of the WSML component. The instance data must be carried from one host page to another to ensure that the user's interaction with the service component proceeds according to the intended workflow. The instance data are read and inserted by the WSML server in HTTP communications relating to the component, preferably in the query field of the URL. Most preferably, the query field includes a query variable ("_wsmlinstances") listing, for each page and instance of the component, the corresponding skin URL (belonging to host site 28) and instance data including the current URL of the component, certain properties of the component ("overridden properties," as described hereinbelow), and the server state of the component (specifying a cached version of the current page, if appropriate, as is also described hereinbelow).

At a component redirection step 102, WSML server 34 receives the HTTP request sent from computer 22 at step 100 and looks up the current instance of the service information for this user. The WSML server preferably extracts the instance and other state information from the above-mentioned query field of the URL in the HTTP request. Based on the state information, WSML server 34 sends a HTTP message to the browser, redirecting the browser to another URL belonging to the WSML server, In which corresponds to the appropriate instance of the service component. (This redirection prevents the reversion to a cached paged, as mentioned above.) In the present example, the appropriate instance is page 44 of service site 32 with the contents of window 46, indicating the flight reserved for the user. From this op point on, the process of interaction continues as it did for the initial component, at step 74 in the method of FIG. 3.

FIG. 3B also illustrates an optional feature of the present invention, wherein the operator of service site 32 enables host site 28 to integrate information generated by the service component into the work flow of the host site. For this purpose, the component includes methods for use by the host page that is to receive the component. The methods are preferably included in the form of JavaScript commands on the service site Web page from which the component is to be taken. For example, a method "getDates" may be provided on page 44, which when invoked returns the dates of the user's flights. To make use of the method, host page 60 includes a button 64. When the user clicks on this button, the getDates method is invoked, enabling the host site to copy the flight details displayed in window 62 to the appropriate date on calendar 54. Other work flow integration functions may be implemented in like manner, using methods both for passing information from the service component to the host site, and from the host site to the service component.

Preparing the Web Site Component and Host Page

Figure 6:
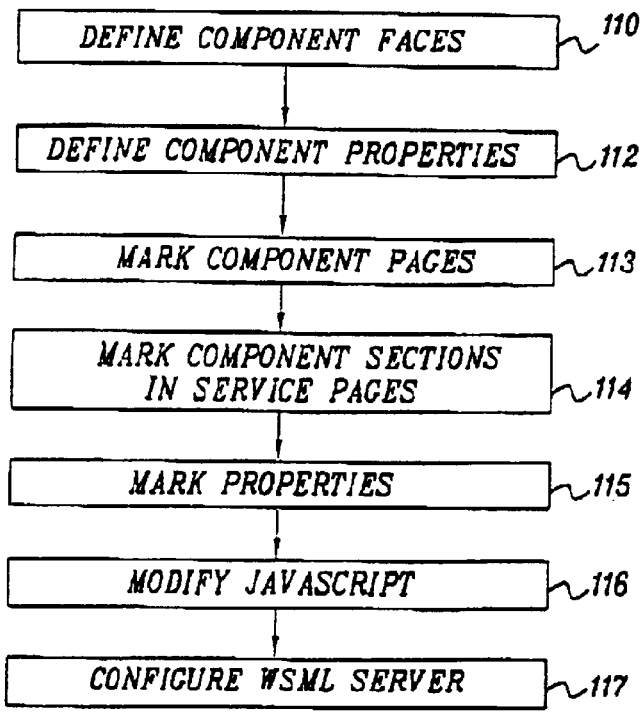
FIG. 6 is a flow chart that schematically illustrates a method for defining a Web page component, in accordance with a preferred embodiment of the present invention.

FIG. 6 is a flow chart that schematically illustrates a method by means of which the operator of service site 32 creates a Web page component for distribution by WSML server 34, in accordance with a preferred embodiment of the present invention. As an aid to understanding, the method is described hereinbelow with reference to a concrete example, in which service site 32 is a bank (with a site www.bank.com), which syndicates its loan services to a host, www.host.com.

The bank creates a component composed of three pages: a loan request form, a loan confirmation request page, and an operation result page. The bank provides these pages in three languages: English, Spanish and French as determined by the query parameter "language." Thus, the URL of the first page is:

```
http://www.bank.com/bank/gx.cgi/FTcs?urltype=
    loan&language=english
```
The page includes the HTML form tag:
```
<form action="http://www.bank.com/bank/gx.cgi/
    confreq?urltype=loan&language=english" method=
    POST>
    . . .
</form>
```
To send in a request for a loan, the user has to fill in his account number and the amount of the loan on the first page. This information is sent to the bank by a HTTP POST request.

The second page is:
```
http://www.bank.com/bank/gx.cgi/confreq?urltype=
    loan&language=english
```
It includes the form and input tags:
```
<form action="http://www.bank.com/bank/gx.cgi/confreq"
    method=GET>
<input type=hidden name=urltype value=loan>
<input type=hidden name=language value=english>
<input type=hidden name=loanid value=265342492>
<input type=submit value="confirm" name="confirm">
<input type=submit value="cancel" name="cancel">
    . . .
</form>
```
The URL of the last page is:
```
http://www.bank.com/bank/gx.cgi/conf?urltype=
    loan&language=english&loanid=265342492&confirm=
    confirm
```
For the sake of illustration (and to bring out certain features of this preferred embodiment), it is assumed that host 28 embeds the session-id inside the URL of all of its links. Thus, a typical URL at the host site looks like:
http://www.host.com/bin/cgi/session334465/abc.html Returning now to FIG. 6, in order to allow the host site to customize aspects of the component pages, the bank associates each of the three pages with a "face," at a face definition step 110. Typically, pages with the same general look and functionality can share a common face. Thus, referring to the example of FIGS. 2A and 2B, page 40, which receives user input, would typically have one face, while page 44, which presents data results, would have another. Associating faces with the component pages at the service site allows the host site to provide a different host page for each different type of service page. The service site also defines properties of the component that the host site is allowed to customize, at a property definition step 112. Host pages to be associated with the faces, as well as values of the customizable properties, are specified in a component skin created by the host site, as described in detail hereinbelow.

The faces, properties and other aspects of the component, are preferably defined in an XML file, stored by the WSML server in a "components" folder. A sample component XML file, "loan.xml," is listed below in Table I. In accordance with standard XML programming practice, the syntax of the file is defined by a Document Type Definition (DTD), which is referenced in the "!DOCTYPE" tag of the file below. The WSML DTD used for this purpose is listed below in Appendix A.

TABLE I

COMPONENT DEFINITION FILE

```
<?xml version="1.0"?>
<!DOCTYPE component PUBLIC
    '-//Elseweb//WSML//DTD//component'>
<component name="Bank loans"
    description="Allows to request a loan"
    initial-page="http://www.bank.com/bank/gx.cgi/FTcs?
      urltype=loan&language=english">
    <alternate-html>
        <![CDATA[
            <img src=1 http: //www.bank.com/images/
              alternate.gif'></img>
        ]]>
    </alternate-html>
    <faces>
        <face wsml-id="request-form"
            name="Request form"
            description="Contains edit controls and submit
              button"/>
        <face wsml-id ="loan-confirmation"/>
    </faces>
    <properties>
        <property wsml-id ="box-background-color"
            forward="no"
            type="color"
            name="Box Background Color"
            description="The background color of the search
              box"/>
        <property wsml-id="language"
            forward="yes"
            type="text"
            name="Language"
              description="The language to use for the page
                (english/spanish/french)"/>
    </properties>
</component>
```

The "component" tag in the listing above indicates the URL of the initial page of the component at the service site, as well as providing an optional name and description of the component. [Brackets] may be used to parameterize the URL with a property value. Using this syntax, it is possible to specify different initial pages that will be called from the service site, depending on a property value defined by the host site.

The "alternate-html" tag specifies the information to be returned by WSML server 34 in case the service site does not return the desired page.

The "faces" tag contains a list of the faces assigned by the service site, wherein each face is identified by a "face" tag. In the present example, one face is assigned for the request form, and a second face for the loan results and confirmation pages.

The "properties" tag contains a list of customizable properties, each identified by a "property" tag. In this case, the bank has chosen to allow host sites to choose the background color and language to be used in the component. The "forward" attribute indicates whether the selected property must be forwarded to the service site. The attribute is preferably forwarded using standard "?name=value" HTTP syntax, wherein "?name" corresponds to the wsml-id of the property. Using "forward" causes the service site to return a different page, depending on the selected property. In the example above, the selected language for the component is forwarded, while the color is not.

Returning to FIG. 6, at a page marking step 113, the relevant pages of the service site are marked with HTML "link" tags, to indicate that they are to be included in a syndicated component. The syntax of the link tag is as follows:

```
<link rel="wsml:component" href="[component URL]#
    [face]">
```
In the example of the bank loan component described above, the first of the three pages will include the tag:
```
<link rel="wsml:component"
href="http://wsml.bank.com/loan#request-form">
```
The other two pages will include the tag:
```
<link rel="wsml:component"
href="http://wsml.bank com/loan#loan-confirmation">
```

The parts of the service site pages that are to be included in the component are marked with appropriate "wsml:" attributes, at a component marking step 114. In the example of FIGS. 2A and 2B, the part of the HTML code that corresponds to windows 42 and 46 would be marked in this manner. These attributes are ignored when a user requests these Web pages directly from the service site. WSML server 34 reads the wsml: attributes to determine what parts of the pages to include in the component, but then strips these attributes from the HTML code that it delivers to computer 22.

For example, the following HTML nugget illustrates the use of a "wsml:include" attribute,
```
<p wsml:include="loan">
    <b><i>Hello</i></b>
</p>
```
The tag "p" at the beginning and end of the nugget is used to mark the HTML segment "<b><i>Hello</i></b>" for parsing by the WSML server. The attribute wsml:include= "loan" indicates to the server that this segment is to be included as part of any component whose URL includes the string "loan". Different parts of the HTML object hierarchy on the service Web page may be included or excluded (using a wsml:exclude tag) in this manner. Objects on service site pages may also be tagged with appropriate attributes to indicated that they are to be included only in the component, and not on the full Web page that is served to the user directly by the service site. Similarly, different parts of the page, or even different lines of text, may be tagged to be arranged in a different manner in the component from the order in which they appear on the service site Web page. The variety of uses of tags of this sort and methods for parsing of such tags by server 34 will be apparent to those skilled in the art.

The properties of the service site pages that are allowed to be customized by the host site are indicated in a property marking step 115, using "wsml:property" attributes. This type of attribute can be applied to any HTML object on the service site page. It preferably has the syntax of cascading style sheets (CSS), as is known in the art of mark-up languages, with the form "attribute name:attribute value." The properties are listed in the XML component definition file, as illustrated in Table I above. When WMSL server 34 delivers the component to computer 22, it reads the property values from the appropriate skin and applies them to the component as specified.

For example, assume that the following tag is included as part of a HTML page on the service site:
```
<font size=1
wsml:property="size:link-font-size;face:link-
    font-face" . . . >
<a href= . . . >click me</a></font>
```
If the value of the property link-font-size specified in the component skin is 2, and link-font-face is Arial, then the WSML server translates this tag into:
```
<font size='2' face='Arial'><a href= . . . >click me</a></
    font>
```
If the property is not specified, font size receives its default value of 1, and the font-face keeps its previous value.

Different properties may also be specified for the same HTML segment when it appears in different components.

Some Web pages dynamically generate links or resources, such as images, using JavaScript code. If one of the service site pages used in the component contains a link to another page within the component or to a resource using a relative URL, WMSL server 34 must be able to modify the relevant URLS. The following actions are preferably taken, at a script modification step 116, in order to handle these cases:

1. Define the following JavaScript functions in each service site page that uses JavaScript to create links or relative resources:
```
<script language="JavaScript">
<!function wsmlMakeComponentHref (url)
{
return url;
}
function wsmlMakeResourceUrl (url)
{
return url;
}
//-->
</script>
```
This code is not included as part of the WSML component itself.

2. For each link created using JavaScript (either using the document.write( ) JavaScript command or using the Document Object Model), call the JavaScript function wsmlMakeComponentHref( ) with the URL of the link. For example, replace the following code:
```
document.write('<a href="'+url+'">Click here </a>');
```
with this:
```
document.write('<a href="'+wsmlMakeComponentHref
    (url)+'">Click here </a>');
```
The function wsmlMakeComponentHref( ) on the WSML server changes the links in the component to point to the appropriate location. It is not necessary to use this function when generating links to external pages. A listing of the function is given in Appendix B.

3. For each relative resource URL (image, Java applet, etc.) created using JavaScript, call the JavaScript function wsmlMakeResourceUrl( ) with the URL of the resource. For example, replace the following code:
```
var rolloverimage=new Image('/images/image1.gif');
```
with the following code:
```
var rolloverImage=new
Image(wsmlMakeResourceUrl('/images/image1.gif'));
```
Appendix B also includes a listing of the function wsmlMakeResourceUrl( ).

All JavaScript source code, including both JavaScript code within the service site page and JavaScript external to the page (which is typically referenced using a <script src=" . . . ">tag), should be modified in this manner.

At a server configuration step 117, the WSML server is installed and configured to serve components from the pages of service site 32. Component and skin XML files for the component are placed in appropriate folders of the WSML server. Preferably, the WSML server receives a domain name that is in a sub-domain of the service site server, particularly if the service site needs access to cookies stored on user computers. Thus, for example, if the domain name of the service site is www.service.com, then the domain name of the WSML server could be wsml.service.com.

Figure 7:
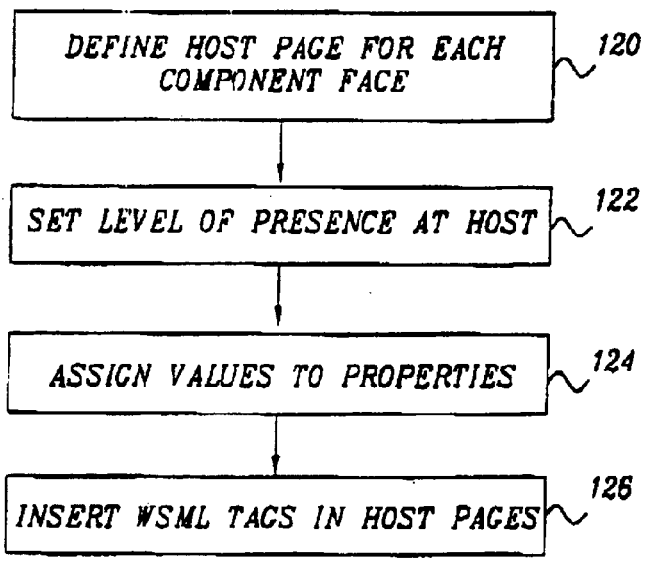
FIG. 7 is a flow chart that schematically illustrates a method for integrating a Web page component into a host Web page, in accordance with a preferred embodiment of the present invention.

FIG. 7 is a flow chart that schematically illustrates a method for integrating a WSML component into host Web pages, in accordance with a preferred embodiment of the present invention. This method is described with reference to the example given above based on bank loan forms, including the XML component definition file in Table I. For the purpose of this example, it is assumed that the host site embeds the HTTP session-id inside the URL of all of its links. Thus, a typical URL at host site 28 might be: http://www.host.com/bin/cgi/session334465/abc.html.

At a page definition step 120, the host site determines which host pages are to host the different pages of the component from the service site. Each of these host pages is preferably associated with a respective one of the faces defined by the service site. For example, the host page for the loan request page of the component could be: http://www.host.com/bank/loan/(sessionid]/request.asp Similarly, the host page for the confirmation page of the component could be: http://www.host.com/bank/loan/[sessionid]/confirm.asp.

Optionally, the host site sets a level of presence to be maintained in the component, at a presence setting step 122. The default value is full presence, meaning that all navigation by the user within the component remains within the host site. On the other hand, it is possible to specify partial presence, whereby a link in one page of the component takes the user out of the host site and into another page on the service site, in a manner akin to site-to-site HTML links known in the art.

Next, the host assigns values to the customizable properties of the component, at a value assignment step 124. These values are recorded in a skin XML file, together with the selections made at steps 120 and 122. The skin XML is defined in Table II:

TABLE II

SKIN DEFINITION FILE

```
<?xml version="1.0"?>
<!DOCTYPE component-skin PUBLIC
  '-//Elseweb//WSML//DTD//component-skin'>
<component-skin component="http://wsml.chase.com/loan "
        presence="full"
        name="Bank loan request in Host">
    <face-hosts>
      <host face="request-form"
        host-page="http://www.host.com/bank/loan
        /[sessionid]/request.asp"/>
      <host face="loan-confirmation"
        host-page="http://www.host.com/bank/loan
        /[sessionid]/confirm.asp"/>
    </face-hosts>
    <property-values>
      <value property="language"
        value="english"/>
    </property-values>
</component-skin>
```

This file is stored as host-loan.xml in the skins folder of the WSML server.

Having identified the host pages on which the component pages will appear, the host site must now insert WSML <script> tags in these pages, at a tag insertion step 126. The tags indicate the locations on the pages at which the component will be displayed. The basic syntax for such a tag is:
<script src="[component skin URL]">
</script>
The component skin URL in our example is wsml.bank.com/host-loan.

It is possible for the host site to override property values defined in the component and the component skin, by specifying the values dynamically in any of the host pages, using the syntax:
<script src="[component skin URL]?property1= value1&property2=value2">

</script>
The optional values given for the properties after the question mark ("?") override values given in the definition of the component skin. Using this feature, different host pages with the same skin can provide different values for the same properties.

In the loan approval component defined above, for example, the HTML code of the first host page under http://www.host.com/bank/loan/[sessionid]/request.asp preferably contains a script tag as follows:
<script
src=http://wsml.bank.com/host-loan?box-background-color=%
23FFFFFF&*sessionid=session12354">
</script>
Similarly, the HTML code for the second page under http://www.host.com/bank/loan/[sessionid]/confirm.asp preferably contains the script tag:
<script
src=http://wsml.bank.com/host-loan?box-background-color=%
23FFFF00&*sessionid=session12354">
</script>
The sessionid host parameter in this case is not a fixed part of the HTML page, but is rather generated by the host site server based on its own session parameters. The asterisk (*) before "sessionid" indicates that the session-id parameter is to be captured from the URL of the previous host page and transferred to the current host page. This facility is used in the present example because, as noted above, the host site uses the session-id as part of the URL. The *sessionid parameter in the above script tags causes the client computer to pass the session-id to the WSML server as part of the component request (at step 74 in FIG. 4). The complete URL that is generated by the WSML server for the second host page is thus http://www.host.com/bank/loan/session12345/request.asp.

Because of XML conventions, the dynamically-determined box background color property (and all other properties specified in scripts) must contain only alphanumeric characters, "-" and "_". Whenever a value includes other characters, it must be "escaped," i.e., the illegal characters must be replaced by % xx, wherein "xx" is the hexadecimal code of the character. Therefore, the property value #FFFF00 of the background color in the component on the second page is represented by "%23FFFF00" in the script tag specified above. This method of escaping illegal characters is preferably observed, as well, with respect to JavaScript commands and instance data that the WSML server inserts in URL query fields, as described above. In fact, when the WSML server prepares URL information for inclusion in the query field, it may already contain characters that have been escaped once, such as "%23" in place of "#". Because the IIS Web server "unescapes" escaped characters, the WSML server escapes the character again, giving "%2520".

WSML Server Implementation

Figure 8:
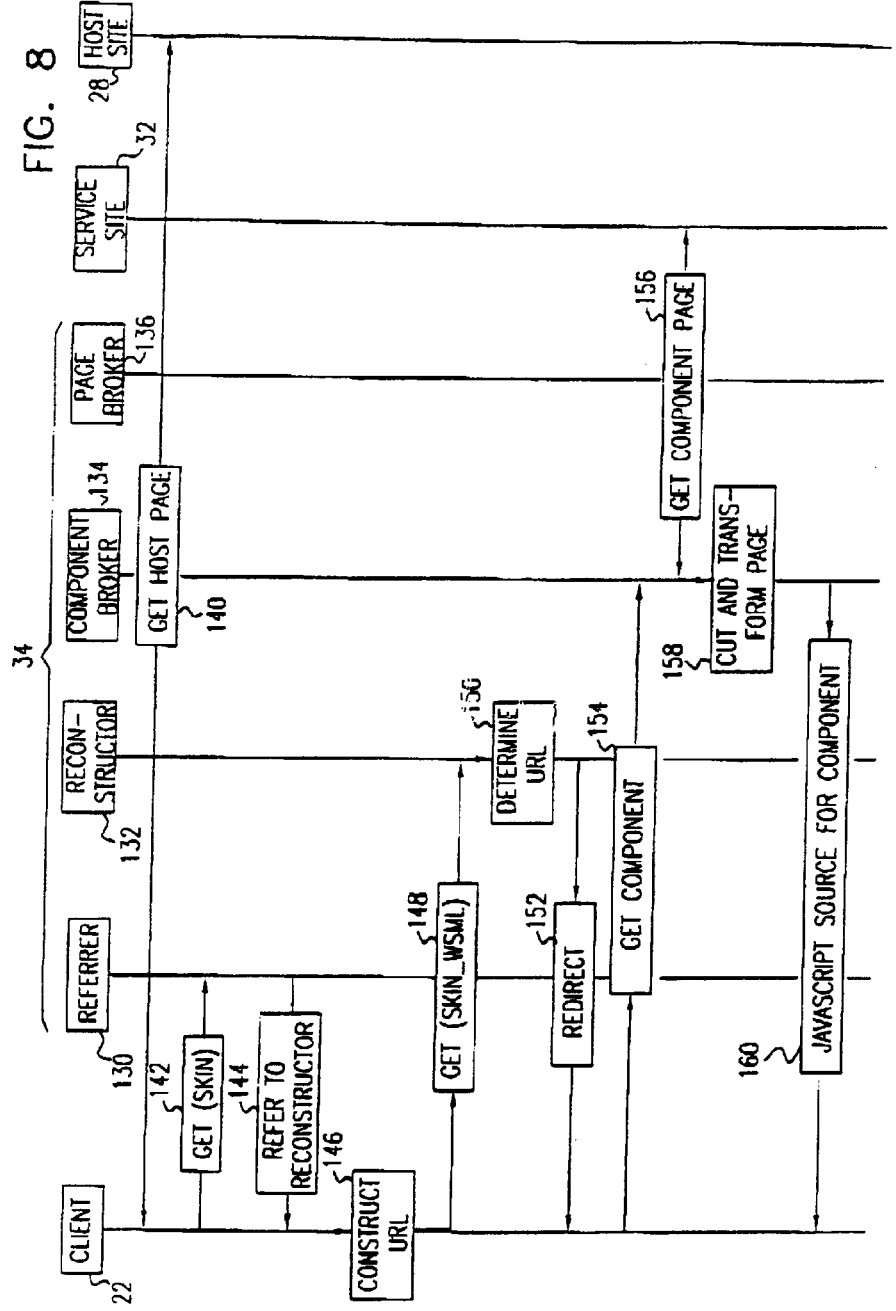
FIG. 8 is a flow diagram that schematically illustrates a method for delivering a Web page component to a client, in accordance with a preferred embodiment of the present invention.

FIG. 8 is a message flow diagram that schematically illustrates generation and delivery of a WSML component to client 22, in accordance with a preferred embodiment of the present invention. The method of FIG. 8 is substantially similar to that shown in FIG. 4 and described with reference thereto. The purpose of FIG. 8 is to provide further detail regarding implementation of the method, and particularly of the functionality of WSML server 34 in this context. Server 34 is divided into four functional blocks: a referrer 130, a reconstructor 132, a component broker 134 and a page broker 136. These blocks represent functional elements of the server, which are preferably implemented as software elements, such as servlets, and not as separate physical entities. An example of actual messages generated using the method of FIG. 8 is shown in Appendix C.

At a host page retrieval step 140 (corresponding to steps 70 and 72 in FIG. 4), the browser on client 22 requests and receives a host page from host site 28. The host page includes a WSML <script src=> tag referring the client to a component URL on server 34, as described above. The tag includes a reference (preferably in the query field) to the host site skin, but does not contain instance information, which must be extracted from the host URL. At a referral request step 142, the script tag causes the client to request ("GET") the component from server 34, while including the host and skin URLs in the request.

The request from the client is received by referrer 130. The referrer uses the JavaScript "document.write" command to create another <script src=> tag referring the client to reconstructor 132, at a referral step 144. This step is needed primarily because certain browsers (notably Netscape Navigator™) will not pass the Host URL in the HTTP referrer field. The source (or argument) of the script tag is a URL of the form:
skinUrl:part/__wsmlreconstructor¶ms= escapedWSMLHostTag
QueryParams&__wsmlreferrer=escapedHostURL
Here "escaped" (as in "escapedHostURL") indicates that any illegal characters in the expression are escaped to % xx before transmission, as described above. The Host URL is retrieved by client 22 using the JavaScript "document.url" object in the document object model of the client browser.

The JavaScript causes client 22 to generate a new URL, at a URL construction step 146. The client inserts into the URL the skin and reconstructor parameters provided in the script. It also passes along any overridden properties in the requested component and host parameters that are listed in the WSML host tag. The client uses this URL in a new "GET" request, at a redirection request step 148. This request now includes the instance information that WSML server 34 needs in order to generate the appropriate component.

The new client request is received by reconstructor 132, which reads the information in the __wsmlreferrer field and other parameters in the request. It uses this information to determine the proper URL for the component page that the client is currently requesting, at a URL determination step 150. The reconstructor redirects the client's browser to component broker 134, at a redirection step 152, with a URL of the form:
skin-url:part/__wsmlcomponentserver/__wsmlinstancedata= instance-data&__wsmlsiblings=rest-of-component- instances&*host-parm1=value1&*host-parm2=value2

Here __wsmlinstancedata contains the instance data of the skin being served, while __wsmlsiblings contains the instances (skin URL and instance data) of the rest of the components found in the host URL. The redirect preferably uses the HTTP 302 status code, as is known in the art.

Figure 9:
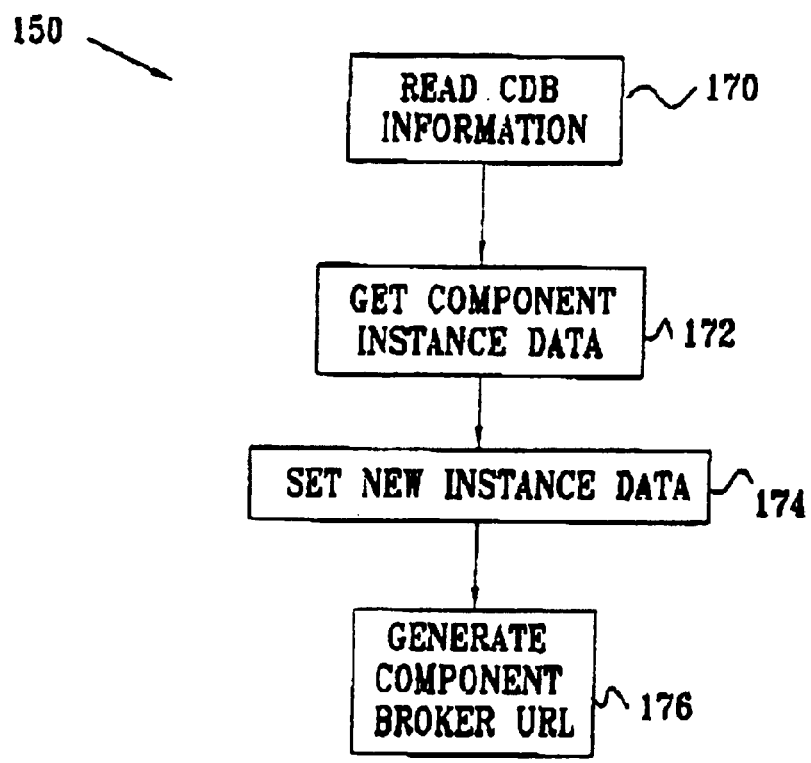
FIG. 9 is a flow chart that schematically illustrates details of the function of a component reconstructor in the method of FIG. 8, in accordance with a preferred embodiment of the present invention.

FIG. 9 is a flow chart that schematically illustrates details of URL determination step 150, in accordance with a preferred embodiment of the present invention. These details are useful in understanding how reconstructor 132 generates the URL passed at step 152. Upon receiving the client request at step 148, the reconstructor reads the information stored in the CDB (the component database, mentioned above) of server 34 with regard to the host skin and the WSML component specified in the request, at a CDB reading step 170. This information preferably includes the component and skin definition XML files described above. At an instance getting step 172, the reconstructor attempts to read the current instance data for the component from the __wsmlreferrer parameter in the host URL received at step 148. The reconstructor goes through all of the skin URLs listed in the __wsmlinstances parameter of the host URL. If the skin URL that was specified in the host script tag is found among the listed skin URLs, then he reconstructor takes the instance data for this component from the host URL. Otherwise, the reconstructor creates an instance comprising the initial URL of the component, without overridden properties or state data. This will be the case when the client is linked from a host page to the component for the first time.

At a new instance step 174, reconstructor 132 sets new instance data. The URL in the new instance data is set to the current URL of the Web page component, including any "forwarded properties" of the component in the current instance. Overridden properties are determined by merging properties given in the <script> tag on the current host page with those found in the previous instance data.

At URL generation step 176, the reconstructor builds the URL to which the client is to be redirected, as illustrated above. This URL refers the client to component broker 132. As noted above, the reconstructor takes all instances that are not the current instance and inserts them into the __wsmlsiblings field. It inserts the new instance data into the __wsmlinstancedata field. If the current page of the Web component is saved in a page repository (see the description of page broker 136 below), and multiple WSML servers are used together for load balancing, for example, it may be necessary to modify the server listed in the instance data of the skin URL so that the redirect will reach the server where the saved page resides.

Although referrer 130 and reconstructor 132 are described herein as separate modules, the functions of these two modules may, in fact, be combined into a single functional element of WSML server 34.

Returning now to FIG. 8, client 22 finally uses the new URL to which it was redirected in order to get the actual Web page component from component broker 134, at a component request step 154. When the component broker receives the request, it gets from service site 32 the actual page from which the component is to be taken, at a page retrieval step 156. It then "cuts out" the tagged sections of the page, and makes the changes that are necessary to transform these sections into a component of the desired appearance and functionality, at a transformation step 158. The final result of this step is JavaScript source code, which is sent to client 22 at a source transmit step 160. At this stage, the client is able to display and browse the host page with the Web component of service site 32 at the specified location one the page.

Figure 10:
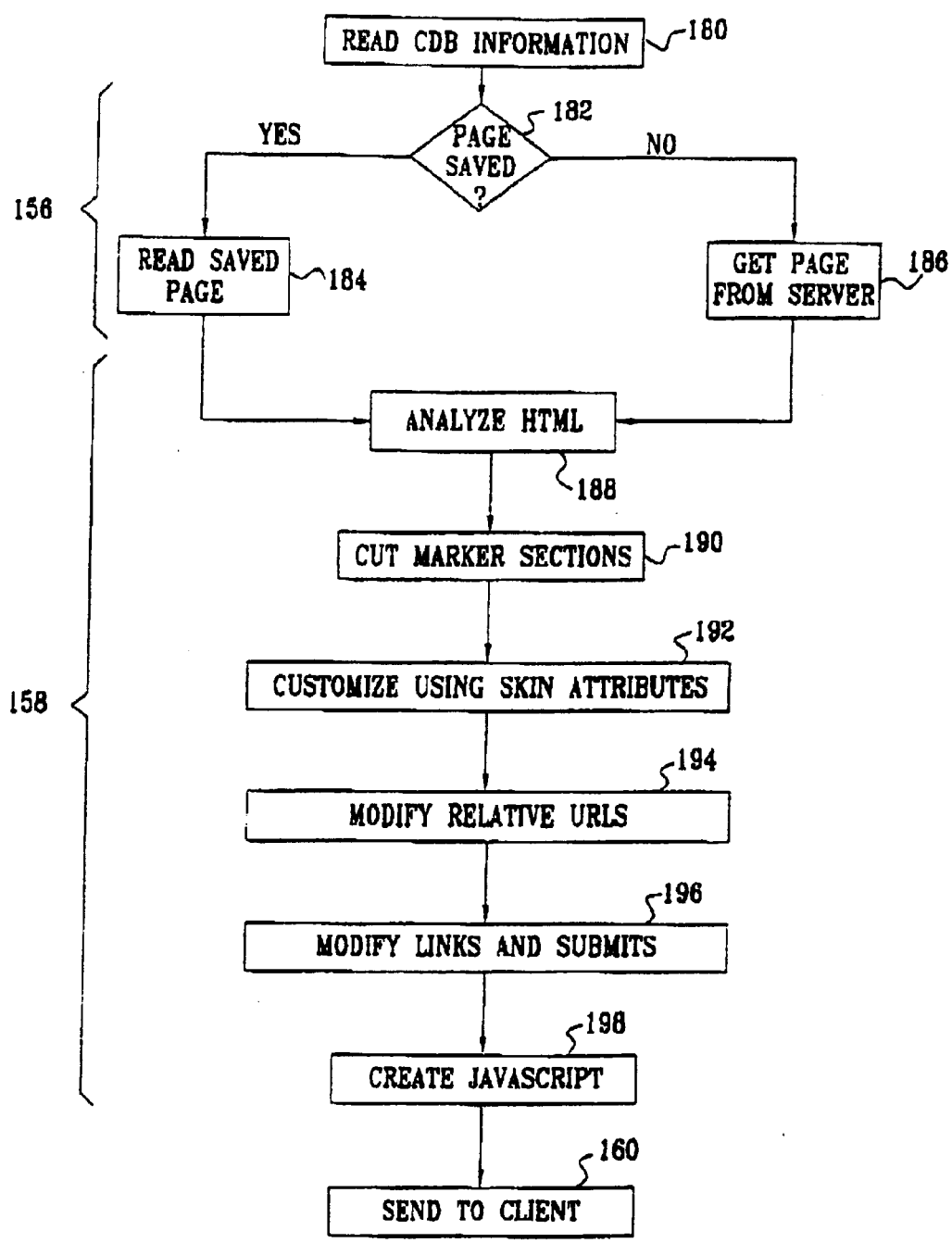
FIG. 10 is a flow chart that schematically illustrates details of the function of a component broker in the method of FIG. 8, in accordance with a preferred embodiment of the present invention.

FIG. 10 is a flow chart that schematically illustrates details of the operation of component broker 134, in accordance with a preferred embodiment of the present invention. As in the case of reconstructor 132, upon receiving the client request at step 154, component broker 134 reads any relevant CDB information for the skin (using the skin URL) and for the component, at a CDB reading step 180. The component broker then checks to determine whether the service site page of the requested component has been saved in the saved pages repository on component server 34 (as described below), at a saved page checking step 182. If the previous instance data includes a handle for saved pages, the component broker reads the page from the repository, at a saved page reading step 184. Otherwise, the component broker must get the page from service site 32, at a page getting step 186. (If the page does rot exist, the component broker returns a JavaScript with an error HTML code, which is preferably stored in the CDB).

At an HTML analysis step 188, the component broker analyzes the HTML code of the retrieved page. If it happens that the page does not belong to the component, the component broker will not be able to process it. In this case, the broker preferably redirects the browser on client 22 to the retrieved page, or serves the page as is. Assuming that the page does belong to the component, however, the component broker cuts the marked sections of the page, at a cutting step 190, and customizes them according to the skin attributes, at a customization step 192. The customization is preferably based on the wsml:property tags described above. If the service pages included in the component include relative URLs (for images, for example), the component server changes them to absolute URLs, at a URL modification step 194, preferably by pre-pending the base URL of the component page. Alternatively, if <BASE href> tags are used in the component pages, this modification is unnecessary.

Component broker 134 also modifies' any links and form submits that appear in the component page, at a link modification step 196. For each link or form submit, the broker creates new instance data by taking the current instance data and placing it in the link URL. If the link URL is relative, it is combined with the current URL of the component to make it absolute. The links also receive the __wsmlinstancedata of the component, while all the rest of the instances are placed in __wsmlsiblings.

At a scripting step 198, the component broker creates a JavaScript script that encloses the HTML code of the component as the argument of a document.write function call, as described above. The script preferably also includes the wsmlMakeComponentHref and wsmlMakeResourceUrl functions described above, which deal with JavaScript links in the service site pages by converting relative links to absolute ones. The complete JavaScript is then sent to the client at step 160.

Figure 11:
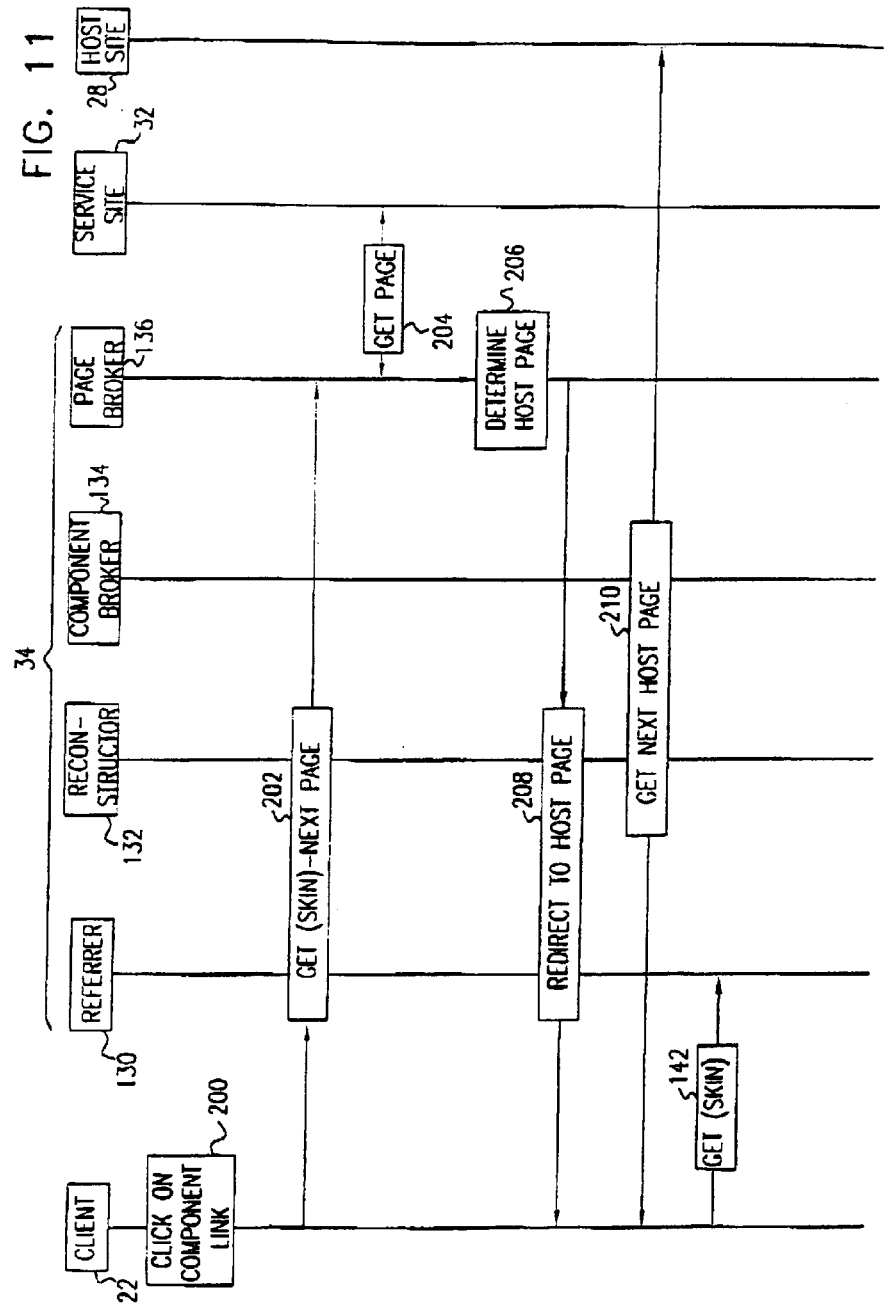
FIG. 11 is a flow diagram that schematically illustrates a method for responding to selection of a link in a Web page component by a client, in accordance with a preferred embodiment of the present invention.

FIG. 11 is a message flow diagram that schematically illustrates the generation and delivery of a second or subsequent page of a component from server 34 to client 22, in accordance with a preferred embodiment of the present invention. The method of FIG. 11 is generally similar to that of FIG. 5, and described here in order to further clarify details of implementation of the method. It begins when a user of client 22 browses a previous component page and clicks on a link to a subsequent page of the component, at a linking step 200.

Clicking on the link causes client 22 to request the next component page, based on the host skin identified in the component, at a page request step 202. The request includes a URL that points to page broker 136, of the form:

skin-url:part/__wsmlpageserver/__wsmlinstancedata=
   instance-data&__wsmlsiblings=rest-of-component-
   instances&*host-parm1=value1&*host-parm2=value2

The page broker is responsible for redirecting the client browser to the correct host page. The identity of this host page is determined by the face of the service page pointed to by the current URL of the component, and by the specified skin of the component. To find the face of the service page, the page broker gets the page from service site 32, at a page getting step 204. The face of this page of the component is given by the HTML <link> tag inserted in the service site page, as described above. Thus, the page broker typically reads each page to determine the face, and then looks at the skin information to find the corresponding host page, at a host determination step 206. Alternatively, the component broker examines only the URLs of the service site pages, preferably applying regular logical expressions to the service site URLs themselves, in order to determine which ones are appropriate for the current component.

The service site page gotten by page broker 136 at step 204 is typically the same page that will be sought subsequently by component broker 134 at step 156. For this reason, when the page broker gets the page, it preferably saves the page in the saved pages repository on server 34. The page broker adds a handle to the saved page in the instance data, for use by the component broker in retrieving the page from the repository.

At a redirection step 208, the page broker redirects the client to the appropriate host page, as specified by the component skin. The host URL to which the client is directed is adjusted to include the __wsmlinstances parameter. At a host page retrieval step 210, the client gets the indicated host page from host site 28. It is expected that this page will also include a WSML host tag, pointing to the next component page that is to be retrieved from server 34. At this point the process of FIG. 8 resumes in a new cycle, starting from step 142, using the new host URL and the instance parameters sent to the client at step 208.

Figure 12:
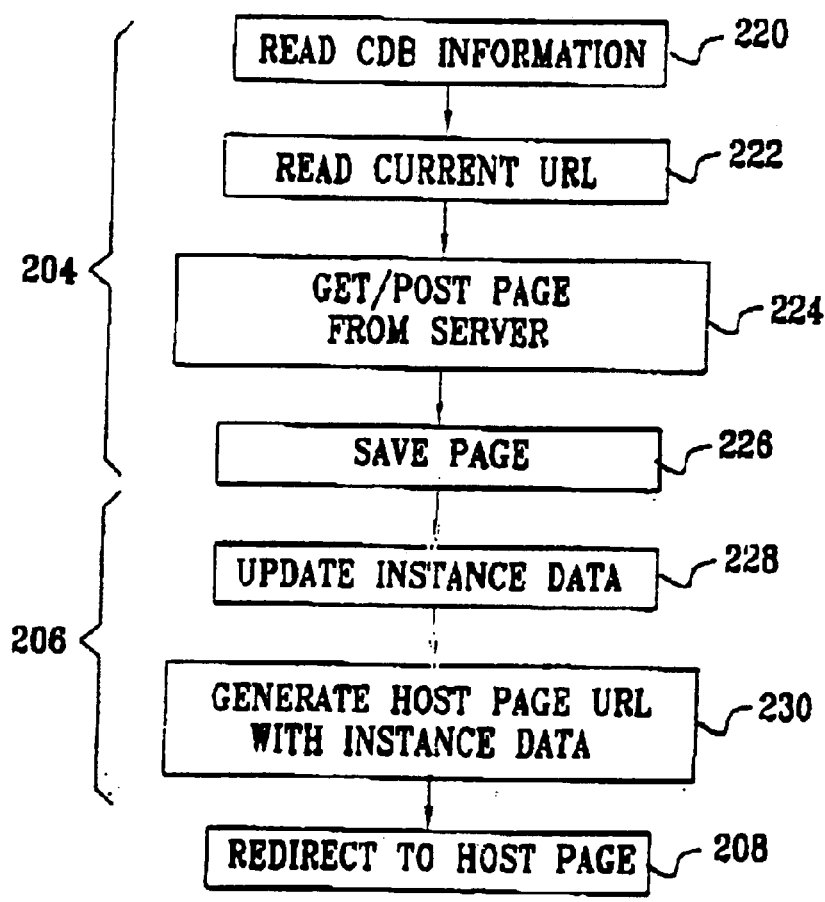
FIG. 12 is a flow chart that schematically illustrates details of the function of a page broker in the method of FIG. 11, in accordance with a preferred embodiment of the present invention.

FIG. 12 is a flow chart that schematically illustrates details of the operation of page broker 136, in accordance with a preferred embodiment of the present invention. Upon receiving the request from client 22 at step 202, the page broker reads any relevant CDB information relating to the host skin and the component, at a CDB reading step 220. It also reads the current URL of the Web page component, at a URL reading step 222, from __wsmlinstancedata in the client request. If the current URL includes a fragment, the page broker removes it and saves it.

Based on this information, the page broker gets the appropriate page from service site 32 (or posts the page, depending on the nature of the HTTP request) and reads the <link> tag on the page, at a page getting step 224. This tag indicates the URL of the host page on which the next component page is to appear. The service site page is saved in the repository, and the handle assigned to the page by the page broker is added to the instance data, at a page saving step 226. The instance data for the component is updated, at an instance updating step 228, by adding the host parameters of the component page to the URL of the host page. (The host parameters are those parameters included in the URL which are prefixed by the asterisk "*".) The page broker finally generates the URL for the host page, at a host page generation step 230. At this step, the page broker adds __wsmlinstances to the host page URL, combining the instances of the component and its siblings, as well as adding the fragment saved above.

Using this new URL, page broker 136 redirects client 22 to the appropriate host page, at step 208, and the process of FIG. 11 continues. As noted above, Appendix C presents a sample interaction along the lines of the processes of FIGS. 8–12.

Although the preferred embodiments described hereinabove are based on certain programming languages and protocols, which are commonly used on the World Wide Web, the principles of the present invention may similarly be implemented using other languages and tools, and in other network information access applications. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Appendix A—WSML XML Files and Definitions

Component DTD

This DTD should be referenced on pages of the service site that are included in components by including the tag

```
<!DOCTYPE  component  PUBLIC  '-//ElseWeb//
WSML//DTD//component'>
<!ELEMENT component (alternate-html?,faces?,properties?)>
<!ATTLIST component initial-page CDATA #REQUIRED
        name CDATA #IMPLIED
        description CDATA #IMPLIED>
    <!ELEMENT alternate-html (#PCDATA)>
        <!ATTLIST alternate-html xml:space
(default|preserve) 'preserve'>
    <!ELEMENT faces (face*)>
        <!ELEMENT face EMPTY>
            <!ATTLIST face wsml-id NMTOKEN #REQUIRED
                name CDATA #IMPLIED
                description CDATA #IMPLIED>
    <!ELEMENT properties (property*)>
        <!ELEMENT property EMPTY>
            <!ATTLIST property wsml-id NMTOKEN #REQUIRED
                name CDATA #IMPLIED
                description CDATA #IMPLIED
                forward (yes|no) 'no'
                type (text|color) 'text'>
```

Component Skin DTD

This DTD should be referenced on pages of the service site that are included in components by including the tag

```
<!DOCTYPE  component  PUBLIC  '-//Elseweb//
WSML//DTD//component- skin'>.
<!ELEMENT component-skin (face-hosts?,property-values?)>
    <!ATTLIST component-skin component CDATA #REQUIRED
            presence (full|partial) 'full'
            name CDATA #IMPLIED
            description CDATA #IMPLIED>
    <!ELEMENT face-hosts (host*)>
        <!ELEMENT host EMPTY>
            <!ATTLIST host face NMTOKENS #REQUIRED
                host-page CDATA #REQUIRED>
    <!ELEMENT property-values (value*)>
        <!ELEMENT value EMPTY>
            <!ATTLIST value property NMTOKEN #REQUIRED
                value CDATA #REQUIRED>
```

Appendix B—JavaScript Functions

The following listing is a Prolog template of the functions that WSML server 34 creates for each request made to component broker 134. It includes the above-mentioned JavaScript functions wsmlMakeResourceUrl and wsmlMakeComponentHref.

```
// PROLOG
// Adding a relative link to trace current base URL.
document.write ('<AREA HREF="."></AREA>');
// Store the current base URL. . .
var wsmlHostBaseUrl =
document.links [document.links.length-1].href;
// Change base URL to component current page.
document.write ('<BASE HREF="%component-base-url;">');
function wsmlIsAbsoluteUrl (url)
{
    var cHttp = "http://";
    var cHttps = "http://";
    return url.substr(0, cHttp.length).toLowerCase( )==
            cHttp ||
        url.substr(0, cHttps.length).toLowerCase( ) ==
            cHttps;
}
function wsmlMakeAbsoluteUrl (relativeUrl)
{
    var baseUrl = '%component-base-url;'
    if (baseUrl.charAt(baseUrl.length - 1) != '/')
        baseUrl += '/';
    var firstPathDelimiterIndex = relativeUrl.indexOf('/');
    if (firstPathDelimiterIndex == 0)
    {
        var baseUrlSchemeEndIndex = baseUrl.indexOf("//")
        var absoluteUrl = baseUrl.substr(0, baseUrl.indexOf
            ('/', baseUrlSchemeEndIndex + 2));
        absoluteUrl += '/' +
            relativeUrl.substr(firstPathDelimiterIndex + 1)
        return absoluteUrl;
    }
    else
        return baseUrl + relativeUrl;
}
function wsmlEscapeInstanceCurrentUrl (absoluteUrl)
{
    var firstTokenEndIndex = absoluteUrl.indexOf('/');
    var escapedUrl = escape(absoluteUrl.substr(0,
firstTokenEndIndex ));
    var urlTokens = absoluteUrl.substr(firstTokenEndIndex +
        1).split('/')
    for(var token in urlTokens)
        escapedUrl += "%2F" + escape(urlTokens[token]);
    return escapedUrl;
}
function wsmlMakeResourceUrl (originalUrl)
}
    if (wsmlIsAbsoluteUrl(originalUrl))
        return originalUrl;
    else
        return wsmlMakeAbsoluteUrl(originalUrl);
}
function wsmlMakeComponentHref (originalUrl)
{
    var result = originalUrl;
    if (wsmlIsAbsoluteUrl(originalUrl))
    {
        var providerDomain = '%top-level-domain;';
        var schemeDelimiterIndex = originalUrl.indexOf ('//');
        var modifiedUrl = originalUrl.substr(0,
schemeDelimiterIndex);
        modifiedUrl += '%link-prefix;';
        modifiedUrl += originalUrl;
        modifiedUrl += '%link-suffix;';
        result = modifiedUrl;
    }
    else if(originalUrl.charAt(0) != '#')
    {
        var baseUrl = '%component-base-url;';
        var baseUrlSchemeEndIndex = baseUrl.indexOf("//")
        var modifiedUrl = baseUrl.substr(0,
            baseUrlSchemeEndIndex) + '%link-prefix;
        modifiedUrl += wsmlEscapeInstanceCurrentUrl
            (wsmlMakeAbsoluteUrl(originalUrl))
        modifiedUrl += '%link-suffix;';
        result = modifiedUrl;
    }
    return result;
}
// end of PROLOG
```

Appendix C—Example Interaction Sequence

The example below illustrates interactions between client 22, WSML server 34 and service site 32, using the sample Web page component defined by Tables I and II above. Reference is also made to steps in the flow diagrams of FIGS. 8 and 11. URL parts that would normally be escaped to remove illegal characters are shown here in italics for clarity.

Host Page (Step 140)

When the user browses to the loan page at the Host site, the browser on client 22 reads and parses the tag:

| |
|---|
| <script<br>src="http://wcss.bank.com/host-loan?box-background-color=#FFFFFF&*sessionid=session12354"><br></script> |

As a result, the browser sends the following GET request to WSML server 34 at wcss.bank.com:

| Client browser request (step 142) |
|---|
| GET     host-loan?box-background-color=#FFFFFF&*sessionid=session12354 HTTP/1.1 |

Referrer 130 processes this request and returns the following response:

| Referrer response (step 144) |
|---|
| HTTP/1.0 200 OK<br>document.write('<script src=... >'); |

The referrer sends the client a JavaScript that makes the client construct a new request containing the current host page and overridden properties:

| Client's browser request (step 148) |
|---|
| GET   /host-loan/_wsmlreconstructor¶ms=box-background-color=#FFFFFF&_wsmlreferrer=http://www.host.com/bank/loan&*sessionid=session12354 |

Reconstructor 132 processes this request and returns the following:

| Reconstructor response (step 152) |
|---|
| HTTP/1.0 302 Found<br>Location:<br>http://wcss.bank.com/host-loan/_wsmlcomponentserver/_wsmlinstancedata=http://www.bank.com/bank/gx.cgi/FTcs?urltype=loan&language=english~box-background-color!#FFFFFF&*sessionid=session12354 |

The browser at the client side follows the HTTP redirect order and comes back to the WSML server (wcss.bank.com) with the following request:

| Client browser request (step 154) |
|---|
| GET    /host-loan/_wsmlcomponentserver/_wsmlinstancedata=http://www.bank.com/bank/gx.cgi/FTcs?urltype=loan&language=english~box-background-color!#FFFFFF&*sessionid=session12354 HTTP/1.1 |

This time, component broker 134 receives the request and as a consequence sends the following request to www.bank.com:

| Component broker request (step 156) |
|---|
| GET /bank/gx.cgi/FTcs?urltype=loan&language=english HTTP/1.1 |

The URL of the component was "un-escaped" before it was sent. Server 32 at www.bank.com responds with:

| Service site response |
|---|
| HTTP/1.0 200 OK<br>[Service page. . . ] |

This response continues with the content of the HTML page of the component. At this point (step 158), the component server modifies the HTML source according to the WSML mark-up of the page and also patches the links on the page. As a result, a form tag that previously read:

| |
|---|
| <form   action="http://www.bank.com/bank/gx.cgi/confreq?urltype=loan&language=english" method=POST> | will be patched to:

| |
|---|
| <form action="http://wcss.bank.com/host-loan/_wsmlpageserver/_wsmlinstancedata=http://www.bank.com/bank/gx.cgi/confreq?urltype=loan&language=english~box-background-color!#FFFFFF&*sessionid=session12354" method=POST> |

The resulting patched page is translated into JavaScript and returned to the client browser in the HTTP response:

| Component broker response (step 160) |
|---|
| HTTP/1.0 200 OK<br>[Javascripted component page. . .] |

At this point the user can see the loan form component from the bank in the designated window on the Host page, and he fills the details in the form and submits it (step 200). This make the browser send the following HTTP request:

| Client browser request (step 202) |
| --- |
| POST /host-loan/__wsmlpageserver/__wsmlinstancedata=http://www.bank.com/bank/gx.cgi/confreq?urltype=loan&language=english~box-background-color!#FFFFFF&*sessionid=session12354 HTTP/1.1 |

This request is submitted to page broker 136 at wcss-.bank.com. The page broker "un-escapes" the URL in the instance data and sends:

| Page broker request (step 204) |
| --- |
| POST /bank/gx.cgi/confreq?urltype=loan&language=English HTTP/1.1 | with the posted data to www.bank.com. The reply is received as:

| Service site response |
| --- |
| HTTP/1.0 200 OK<br>[Service site reply. . .] |

This response continues with the HTML data of the next, component page. The page broker caches the data in the saved pages repository, analyzes the meta-information in the HTML header, deduces the appropriate face, and uses the skin and the face in order to determine the proper host page based on the skin XML file (step 206). It then sends back to the client:

| Page broker response (step 208) |
| --- |
| HTTP/1.0 302 Found<br>Location:<br>http://www.host.com/bank/loan/session12354/confirm.asp?__wsmlinstances=http://wcss.bank.com/host-loan,http://www.bank.com/bank/gx.cgi/confreq?urltype=loan&language=english~box-background-color!#FFFFFF~0001FA346715!wcss.bank.com |

The "0001FA346715!wcss.bank.com" field that was added to the instance data represents the server-side state (SSS), indicating that this page is cached and telling how to find its cached copy. The second part of the SSS is the DNS address of the server where the page resides. The host parameters that were sent back and forth previously between client 22 and the server 34 are now embedded in the host URL instead of the %sessionid; term.

As a result of the page broker's response, the browser downloads the new host page from http://www.host.com/bank/loan/session12354/confirm.asp (step 210). Inside the new host page is the WSML host tag ("<script src= . . . >"), causing the browser to send the following request to the WSML server at wcss.bank.com:

| Client browser request (step 142) |
| --- |
| GET /host-loan?box-background-color=#FFFFFF&*sessionid=session12354 HTTP/1.1 |

This request is analyzed by referrer 130, which returns a JavaScript containing the current Host URL and overridden properties:

| Referrer response (step 144) |
| --- |
| HTTP/1.0 200 OK<br>document.write('<script src= .....>'); |

The referrer sends the client a JavaScript that constructs a new request containing the Host URL and overridden properties:

| Client browser request (step 148) |
| --- |
| GET /host-loan/__wsmlreconstructor¶ms=box-background-color=#FFFFFF&__wsmlreferrer=http://www.host.com/bank/loan/session12354/confirm.asp?__wsmlinstances=wcss.bank.com/host-loan,http://www.bank.com/bank/gx.cgi/confreq?urltype=loan&language=english~box-background-color!#FFFFFF~0001FA346715!wcss.bank.com |

Reconstructor 132 processes this request and returns the following:

| Reconstructor response (step 152) |
| --- |
| HTTP/1.0 302 Found<br>Location:<br>http://wcss.bank.com/host-loan/__wsmlcomponentserver/__wsmlinstancedata=http://www.bank.com/bank/gx.cgi/confreq?urltype=loan&language=english~box-background-color!#FFFFFF~0001FA346715&*sessionid=session12354 |

The client responds:

| Client browser request (step 154) |
| --- |
| GET /host-loan/__wsmlcomponentserver/__wsmlinstancedata=http://www.bank.com/bank/gx.cgi/FTcs?urltype=loan&language=english~box-background-color!%23FFFFFF~001FA346715&*sessionid=session12354 HTTP/1.1 |

At this point the component broker 134 analyzes the request. Since it contains a SSS, the component broker use this data to find the cached page from service site 32. The component broker then modifies and JavaScripts the component and sends the "200" response (step 160) to the resulting JavaScript.

What is claimed is:

1. A method for displaying information, comprising:
identifying computer-readable service code at a service site, which code is written in a mark-up language, such that when the code is read by a browser program on a client computer via a network, the code causes the computer to display at least one service page containing service information;

selecting at least a portion of the service code for inclusion in a service component containing at least a portion of the service information that corresponds to the selected code;

generating a pointer indicating a server at which the service component is accessible, for inclusion of the pointer in host code accessible to the client computer from a host site, which is separate from the service site and is accessible via the network, the host code, when read by the client computer, causing the computer to display a host page containing host information;

receiving at the server an invocation of the pointer by the client computer when the client computer accesses the host page; and conveying from the server to the client computer a script command for execution by the browser program on the client computer, the script command having at least a part of the selected service code as an argument, such that responsive to the script command, the client computer displays the service component on the host page.

2. A method according to claim 1, wherein the network comprises the Internet, and wherein the service site and host site comprise World Wide Web sites.

3. A method according to claim 1, wherein the mark-up language comprises Hypertext Mark-up Language (HTML).

4. A method according to claim 1, wherein selecting at least the portion of the service code comprises adding Extensible Mark-up Language (XML) tags to the mark-up language code.

5. A method according to claim 4, wherein adding the XML tags comprises inserting an XML tag defining an attribute of the component that can be altered when the component is displayed on the host page.

6. A method according to claim 1, wherein selecting the service code comprises defining one or more pages of the service code for inclusion in the component by means of an indication external to the one or more pages.

7. A method according to claim 6, wherein the indication comprises an Extensible Mark-up Language (XML) file.

8. A method according to claim 6, wherein the indication is given in a database.

9. A method according to claim 6, wherein defining the one or more pages comprises defining first and second pages for inclusion in the component, wherein the second page is defined by a link on the first page.

10. A method according to claim 1, wherein conveying the script command comprises conveying a JavaScript document.write command.

11. A method according to claim 1, wherein the selected service code comprises instructions in a scripting language for execution by the client computer.

12. A method according to claim 1, wherein the pointer comprises a uniform resource locator (URL).

13. A method according to claim 12, wherein the service component has a state, and wherein receiving the invocation of the pointer comprises receiving a hypertext transfer protocol (HTTP) request specifying the URL and the state of the component.

14. A method according to claim 13, wherein specifying the state of the component comprises inserting information regarding the state in a query portion of the URL.

15. A method according to claim 12, wherein the URL is inserted in textual tag that is included in the host code.

16. A method according to claim 15, wherein the textual tag comprises a script tag.

17. A method according to claim 1, wherein selecting the service code comprises associating with the code an indication of one or more properties of the component that can be altered when the component is displayed on the host page.

18. A method according to claim 17, and comprising defining a skin that specifies a value to be assigned to at least one of the properties when the service component is displayed on the host page.

19. A method according to claim 18, wherein generating the pointer comprises passing the pointer to multiple host sites for inclusion in the host code of each of the sites, and
wherein defining the skin comprises defining a respective skin for each of the host sites.

20. A method according to claim 18, wherein conveying the selected service code comprises modifying the at least one of the properties in the code conveyed to the client computer responsive to the skin.

21. A method according to claim 17, wherein the host page is one of a plurality of host pages at the host site, including first and second host pages, both including the pointer, and comprising specifying a first value to be assigned to at least one of the properties when the component is displayed on the first host page, and a second value to be assigned to the at least one of the properties when the component is displayed on the second host page.

22. A method according to claim 17, wherein adding the indication of the one or more properties comprises specifying one or more visual properties that can be customized by an operator of the host site.

23. A method according to claim 17, wherein generating the pointer comprises passing the pointer to first and second host sites for inclusion in the host code of each of the sites,
wherein a first value is applied to at least one of the properties when the component is displayed on the host page of the first host site, and a second value, different from the first value, is applied to the at least one of the properties when the component is displayed on the host page of the second host site.

24. A method according to claim 23, wherein receiving the invocation of the pointer comprises receiving an indication of whether the client computer received the pointer from the first or the second site, and
wherein conveying the selected service code to the client computer comprises modifying the at least one of the properties in the selected service code conveyed to the client computer responsive to the indication.

25. A method according to claim 1, wherein selecting the service code comprises adding to the code a method for extracting data from the service component for use by the host site.

26. A method according to claim 25, wherein the extracted data relates to a service provided by the service site to a user of the client computer in return for payment.

27. A method according to claim 1, wherein generating the pointer comprises passing the pointer to multiple host sites for inclusion in the host code of each of the sites.

28. A method according to claim 27, wherein the multiple host sites comprise first and second host sites, and wherein receiving the invocation of the pointer comprises receiving an indication of whether the client computer received the pointer from the first or the second site, and
wherein conveying the selected service code to the client computer comprises modifying the information conveyed to the client computer responsive to the indication.

29. A method according to claim 28, wherein the service component has a state, and the information conveyed to the client computer comprises instance data indicative of the state of the component, and wherein modifying the information comprises modifying the instance data conveyed to the client computer dependent upon whether the client computer received the pointer from the first or the second site.

30. A method according to claim 27, wherein the service site provides a service to a user of the client computer who interacts with the service site via the network, and wherein conveying the selected service code of the service code to the client computer comprises enabling the user to procure the service while viewing the host page of any of the multiple host sites on the client computer.

31. A method according to claim 30, wherein the service site provides the service in return for payment.

32. A method according to claim 1, wherein identifying the service code comprises identifying code corresponding to multiple service pages to be included in the service component, including first and second service pages, wherein selecting the service code comprises selecting first and second portions of the code corresponding respectively to the first and second service pages, the first selected portion comprising a link from the first page to the second page, and comprising:

receiving an invocation of the link by the client computer while the first page of the service component is displayed on one of the host pages; and conveying the second selected portion to the client computer responsive to the link, whereby the second page of the service component is displayed on the client computer.

33. A method according to claim 32, wherein the host page is one of a plurality of host pages at the host site, and wherein conveying the second selected portion comprises conveying the second selected portion such that responsive thereto, the client computer displays the second service page on one of the host pages.

34. A method according to claim 33, wherein the client computer displays each of the first and second pages of the service component in a predefined location on one of the host pages.

35. A method according to claim 33, and comprising specifying one of the host pages to be :associated respectively with each of the service pages, such that when one of the service pages is displayed in the service component, it is displayed on the one of the host pages that is associated therewith.

36. A method according to claim 35, wherein specifying the one of the host pages comprises associating the first and second service pages respectively with first and second ones of the host pages, and wherein conveying the second selected portion comprises, responsive to the invocation of the link, calling for the second one of the host pages to be displayed on the client computer.

37. A method according to claim 36, and comprising modifying the link from the first service page to the second service page so that it links directly to the second one of the host pages.

38. A method according to claim 36, wherein calling for the second one of the host pages to be displayed comprises redirecting the client computer to access the second one of the host pages at the host site.

39. A method according to claim 35, wherein identifying the code corresponding to the multiple service pages comprises associating the multiple service pages with respective faces, and wherein specifying the one of the host pages to be associated respectively with each of the service pages comprises recording, for each of the faces, a corresponding host page.

40. A method according to claim 39, wherein associating the service pages with the respective faces comprises associating at least two of the pages with the same one of the faces.

41. A method according to claim 32, wherein the first and second service pages are associated with a process running on the service site, the process having a state, and wherein conveying the second selected portion comprises conveying instance data indicative of the state of the process.

42. A method according to claim 41, wherein the process is associated with a transaction between the service site and a user of the client computer who interacts with the service site via the network, and wherein conveying the second selected portion comprises consummating the transaction.

43. A method according to claim 1, wherein generating the pointer comprises generating a pointer to the service site.

44. A method according to claim 1, wherein generating the pointer comprises generating a pointer to a location of the server remote from the service site.

45. A method according to claim 1, wherein the host code is conveyed from the host site to the client computer without passing through the location at which the service component is accessible.

46. A method according to claim 1, and comprising receiving the host code at the location at which the service component is accessible, wherein conveying the selected service code comprises conveying both the host code and the selected service code from the location to the client computer.

47. A component server, comprising computer apparatus that is adapted to receive an identification of computer-readable service code at a service site, which code is written in a mark-up language, such that when the code is read by a browser program on a client computer via a network, the code causes the computer to display at least one service page containing service information, wherein at least a portion of the service code is selected for inclusion in a service component containing at least a portion of the service information that corresponds to the selected code, and wherein a pointer is generated indicating a location of the server at which the service component is accessible, for inclusion of the pointer in host code accessible to the client computer from a host site, which is separate from the service site and is accessible via the network, the host code, when read by the client computer, causing the computer to display a host page containing host information, which apparatus is further adapted to receive via the network an invocation of the pointer by the client computer when the client computer accesses the host page, and to convey to the client computer over the network a script command for execution by the browser program on the client computer, the script command having at least a part of the selected service code as an argument, such that responsive to the script command, the client computer displays the service component on the host page.

48. A server according to claim 47, wherein the network comprises the Internet, and wherein the server comprises a World Wide Web server.

49. A server according to claim 47, wherein the mark-up language comprises Hypertext Mark-up Language (HTML), and wherein the selected service code is tagged with Extensible Mark-up Language (XML) tags.

50. A server according to claim 47, wherein the pointer comprises a uniform resource locator (URL).

51. A server according to claim 47, wherein the selected service code comprises an indication of one or more properties of the component that can be altered when the component is displayed on the host page, and wherein the apparatus is adapted to alter the data conveyed to the client computer responsive to the properties.

52. A server according to claim 51, and comprising a memory, which is adapted to store a skin, which specifies a value to be assigned to at least one of the properties when the service component is displayed on the host page, and wherein the apparatus is adapted to alter the data in accordance with a skin stored by the server.

53. A server according to claim 47, wherein the pointer is passed to multiple host sites, including first and second host sites, for inclusion in the host code of each of the sites, and wherein the apparatus is adapted receive an indication of whether the client computer is accessing the first or the second host site, and to modify the data conveyed to the client computer responsive to the indication.

54. A server according to claim 53, wherein the indication is contained in the invocation received by the apparatus from the client computer.

55. A server according to claim 47, wherein the service code corresponds to multiple service pages to be included in the service component, including first and second selected portions corresponding to first and second service pages, the first selected portion comprising a link from the first page to the second page, and wherein responsive to an invocation of the link by the client computer while the first page of the service component is displayed on one of the host pages, the apparatus is adapted to convey the second selected portion to the client computer.

56. A server according to claim 47, wherein the apparatus is adapted to operate at the service site.

57. A server according to claim 47, wherein the apparatus is adapted to operate remotely from the service site.

58. A server according to claim 47, wherein the host code is conveyed over the network from the host site to the client computer without passing through the apparatus.

59. A server according to claim 47, wherein the apparatus is further adapted to receive the host code and to convey both the host code and the selected service code together to the client computer.

60. A computer software product, comprising a computer-readable medium in which program instructions are stored, which instructions, when read by a computer server, cause the server to receive an identification of computer-readable service code at a service site, which code is written in a mark-up language, such that when the code is read by a browser program on a client computer via a network, the code causes the computer to display at least one service page containing service information, wherein at least a portion of the service code is selected for inclusion in a service component containing at least a portion of the service information that corresponds to the selected code, and wherein a pointer is generated indicating a location of the server at which the service component is accessible, for inclusion of the pointer in host code accessible to the client computer at a host site, which is separate from the service site and is accessible via the network, the host code, when read by the client computer, causing the client computer to display a host page containing host information, and wherein the instructions further cause the server to receive an invocation of the pointer by the client computer when the client computer accesses the host page, and to convey to the client computer a script command for execution by the browser program on the client computer, the script command having at least a part of the selected service code as an argument, such that responsive to the script command, the client computer displays the service component on the host page.

61. A product according to claim 60, wherein the network comprises the Internet, and wherein the computer server comprises a World Wide Web server.

* * * * *

UNITED STATES PATENT AND TRADEMARK OFFICE
CERTIFICATE OF CORRECTION

PATENT NO. : 6,865,593 B1 Page 1 of 1
APPLICATION NO. : 09/592975
DATED : March 8, 2005
INVENTOR(S) : Elion Reshef et al.

It is certified that error appears in the above-identified patent and that said Letters Patent is hereby corrected as shown below:

Title page, Item (73): Assignee should read: WebCollage, Inc., New York, NY (US)

Signed and Sealed this

Third Day of August, 2010

David J. Kappos
*Director of the United States Patent and Trademark Office*